(12) United States Patent
Ono

(10) Patent No.: US 7,663,569 B2
(45) Date of Patent: Feb. 16, 2010

(54) IMAGE DISPLAY APPARATUS, IMAGE DISPLAY SYSTEM, AND IMAGE DISPLAY METHOD

(75) Inventor: Munenori Ono, Kanagawa (JP)

(73) Assignee: Sony Corporation, Tokyo (JP)

( * ) Notice: Subject to any disclaimer, the term of this patent is extended or adjusted under 35 U.S.C. 154(b) by 579 days.

(21) Appl. No.: 11/054,408

(22) Filed: Feb. 10, 2005

(65) Prior Publication Data

US 2005/0210390 A1    Sep. 22, 2005

(30) Foreign Application Priority Data

Mar. 4, 2004   (JP)   ............................. 2004-061422
Nov. 26, 2004  (JP)   ............................. 2004-342367

(51) Int. Cl.
G09G 5/00 (2006.01)
(52) U.S. Cl. .......................... 345/2.3; 345/1.2; 709/227
(58) Field of Classification Search ........... 345/1.1–1.2, 345/2.1–2.3; 715/733–739, 744; 709/227–229
See application file for complete search history.

(56) References Cited

U.S. PATENT DOCUMENTS 6,388,654 B1 *   5/2002   Platzker et al. .............. 345/156
6,860,609 B2 *   3/2005   Olson et al. .................. 353/122
7,098,869 B2 *   8/2006   Vaitekunas et al. ........... 345/2.1
2002/0015004 A1* 2/2002   Chino et al. ................. 345/2.1
2002/0140630 A1* 10/2002  Vaccarelli .................... 345/2.1
2004/0130502 A1* 7/2004   Sato et al. .................... 345/2.1
2005/0044126 A1* 2/2005   Oogaki et al. ............... 709/200

FOREIGN PATENT DOCUMENTS

JP      2004-013849      1/2004

* cited by examiner

*Primary Examiner*—Amr Awad
*Assistant Examiner*—Michael Pervan
(74) *Attorney, Agent, or Firm*—Oblon, Spivak, McClelland, Maier & Neustadt, L.L.P.

(57) ABSTRACT

An image display apparatus includes a memory for holding in advance, of the one or more information terminal apparatuses connected via a network, information of information terminal apparatuses whose connection to the network is desired, a controller for reading out the information of the information terminal apparatuses stored in the memory, and display section for displaying a list of the information of the information terminal apparatuses. In this case, the image display apparatus further includes selector for selecting one information terminal apparatus from the list displayed on the display section, it is able to change the connection of the information terminal apparatus to desired information terminal apparatus by manipulation of the selector on a display screen.

17 Claims, 18 Drawing Sheets

FIG. 5

| | 7 | 8 |
|---|---|---|
| NETWORK MODE | | AD HOC MODE |
| NETWORK NAME (SSID) | | PJ-005 |
| NETWORK CHANNEL | | 11 |
| DATA ENCRYPTION (WEP) | | 382654····· |
| IP ADDRESS | | AUTO IP (DHCP) |
| SUBNET MASK | | 255.255.0.0 |

IMAGE DISPLAY APPARATUS, IMAGE DISPLAY SYSTEM, AND IMAGE DISPLAY METHOD

CROSS REFERENCE TO RELATED APPLICATION

This application claims priority from Japanese Priority Documents No. 2004-061422, filed on Mar. 4, 2004 and No. 2004-342367, filed on Nov. 26, 2004 with the Japanese Patent Office, which documents are hereby incorporated by reference.

BACKGROUND OF THE INVENTION

1. Field of the Invention

The present invention relates to an image display apparatus that receives images transferred from a plurality of information terminal apparatuses connected to a wireless or wire network, and displays them on a display section, and further relates to an image display system and an image display method that include a plurality of information terminal apparatuses connected to a wireless or wire network and an image display apparatus.

2. Description of Related Art

In general, as apparatuses for displaying an image (hereinafter referred to as image display apparatuses), image display apparatuses such as projection display systems comprised of a predetermined plane of projection (projection screen) and an image projection apparatus (projector: PJ) that projects and displays an image on the screen, cathode ray tube (CRT) display apparatuses that display an image using cathode rays, image display apparatuses that display an image on a liquid crystal display (LCD) section and the like are known. Such image display apparatuses generally are capable of receiving image information that is sent from an information terminal apparatus, such as a personal computer, through wire communications or wireless communications, and of displaying an image corresponding to the received image information.

In Patent Document 1 mentioned below, a configuration is disclosed wherein, between an information terminal apparatus and an image display apparatus that are wire connected, a projector receives image information transmitted from the information terminal apparatus, and projects it onto a screen.

Patent Document 1: Japanese Laid-Open Patent Application No. 2002-123238

SUMMARY OF THE INVENTION

Up until now, as in the Patent Document 1 mentioned above, in order to transfer an image from an information terminal apparatus connected to a network to the above-mentioned projector via the network, and to display it on a screen, operations had to be performed on the side of the information terminal apparatus. On the other hand, it was difficult to select, from the side of the projector, an information terminal apparatus from among a plurality of information terminal apparatuses on the side that sends the image.

The present invention is made in view of the circumstances mentioned above, and seeks to provide an image display apparatus and image display method that are capable of switching among a plurality of networked information terminal apparatuses and selecting a desired information terminal apparatus therefrom, and of displaying on a display section image information from the desired information terminal apparatus.

In addition, the present invention is made in view of the circumstances above, and seeks to provide an image display system including a plurality of information terminal apparatuses connected to a wire or wireless network and an image display apparatus, wherein switching among the plurality of networked information terminal apparatuses and selecting a desired information terminal apparatus therefrom can be performed from the side of the image display apparatus, and image information from the desired information terminal apparatus can be displayed on a display section of the image display apparatus.

In order to solve the problems above, an image display apparatus related to the present invention is an image display apparatus including a display section and communications means, and in which image information sent from one or more information terminal apparatuses via a network is received by the above-mentioned communications means and an image based on the above-mentioned image information is displayed on the above-mentioned display section, and is equipped with holding means that stores and holds in advance, of the above-mentioned one or more information terminal apparatuses, information of information terminal apparatuses whose connection to the network is desired, control means that reads the information of the information terminal apparatuses held by the above-mentioned holding means, image signal output means that generates an image signal for displaying, on the above-mentioned display section and, as a list, the information of the information terminal apparatuses read by the above-mentioned control means, and selecting means that selects one information terminal apparatus from the list displayed on the above-mentioned display section, wherein the above-mentioned control means generates a connection request signal with respect to the information terminal apparatus selected by the above-mentioned selecting means, and the above-mentioned communications means transmits the above-mentioned connection request signal from the above-mentioned control means.

The image signal output means generates the image signal for displaying, as a list, the information of the information terminal apparatuses read from the holding means by the control means, the control means generates the connection request signal with respect to the information terminal apparatus selected by the selecting means from the list displayed on the display section based on the above-mentioned image signal, and the communications means transmits the above-mentioned connection request signal.

In order to solve the problems above, an image display system related to the present invention is an image display system that includes one or more information terminal apparatuses that are connectable to a network and an image display apparatus that receives a transfer of image information via the network from the above-mentioned one or more information terminal apparatuses and displays on a display section an image based on the above-mentioned image information, wherein the above-mentioned image display apparatus includes holding means that stores and holds in advance, of the above-mentioned one or more information terminal apparatuses, information of information terminal apparatuses whose connection to the network is desired, control means that reads the information of the information terminal apparatuses held by the above-mentioned holding means, image signal output means that generates an image signal for displaying, on the above-mentioned display section and, as a list, the information of the information terminal apparatuses read by the above-mentioned control means, and selecting means that selects one information terminal apparatus from the list displayed on the above-mentioned display section, and wherein the above-mentioned control means generates a connection request signal with respect to the information terminal apparatus selected by the above-mentioned selecting means, the above-mentioned communications means transmits the above-mentioned connection request signal generated by the above-mentioned control means, and the above-mentioned selected information terminal apparatus transmits the above-mentioned image information after transmitting an acceptance response signal in response to the above-mentioned connection request signal.

The image signal output means of the image display apparatus generates the image signal for displaying, as a list, the information of the information terminal apparatuses read from the holding means by the control means, the control means generates the connection request signal with respect to the information terminal apparatus selected by the selecting means from the list displayed on the display section based on the above-mentioned image signal, and the communications means transmits the above-mentioned connection request signal. The selected information terminal apparatus transmits the above-mentioned image information after transmitting the acceptance response signal in response to the above-mentioned connection request signal.

In order to solve the problems above, an image display method related to the present invention is an image display method for an image display apparatus that receives image information that is sent from one or more information terminal apparatuses via a network and displays an image based on this image information, wherein the method includes a holding step that stores and holds in advance, of the above-mentioned one or more information terminal apparatuses, information of those whose connection to the network is desired, a reading step that reads the information of the information terminal apparatuses held in the above-mentioned holding step, a displaying step that displays, as a list, the information of the information terminal apparatuses that are read, a selecting step that selects one information terminal apparatus from the displayed list, and a transmitting step that generates and transmits a connection request signal with respect to the selected information terminal apparatus.

The displaying step displays, as a list, the information of the information terminal apparatuses read in the reading step, and the transmitting step generates and transmits the connection request signal with respect to the information terminal apparatus selected from the displayed list in the selecting step.

According to an image display apparatus of the present invention, it is possible to switch among the plurality of information terminal apparatuses connected to the network and select a desired information terminal apparatus therefrom, and to display on the display section image information from the desired information terminal apparatus, because the image signal output means generates the image signal for displaying, as a list, the information of the information terminal apparatuses read from the holding means by the control means, the control means generates the connection request signal with respect to the information terminal apparatus selected by the selecting means from the list displayed on the display section based on the above-mentioned image signal, and the communications means transmits the above-mentioned connection request signal.

According to an image display system of the present invention, the image signal output means of the image display apparatus generates the image signal for displaying, as a list, the information of the information terminal apparatuses read from the holding means by the control means, the control means generates the connection request signal with respect to the information terminal apparatus selected by the selecting means from the list displayed on the display section based on the above-mentioned image signal, and the communications means transmits the above-mentioned connection request signal. In addition, the selected information terminal apparatus transmits the above-mentioned image information after transmitting the acceptance response signal in response to the above-mentioned connection request signal. Thus, as a system, it is possible to, from the side of the image display apparatus, switch among the plurality of networked information terminal apparatuses and select the desired information terminal apparatus therefrom, and to display on the display section of the image display apparatus the image information from the desired information terminal apparatus.

According to an image display method of the present invention, the image display apparatus is able to switch among the plurality of networked information terminal apparatuses and to select a desired information terminal apparatus therefrom, and to display image information from the desired information terminal apparatus, because the displaying step displays, as a list, the information of the information terminal apparatuses read in the reading step, and the transmitting step generates and transmits the connection request signal with respect to the information terminal apparatus selected in the selecting step from the displayed list.

BRIEF DESCRIPTION OF THE DRAWINGS

FIG. 5 is a diagram showing an example of configuration information;

DESCRIPTION OF THE PREFERRED EMBODIMENTS

Hereinafter, embodiments of the present invention will be described with reference to the drawings. The following embodiment is an image display system including an example of an image display apparatus of the present invention and information terminal apparatuses that transmit image information to this example of an image display apparatus via a network.

Figure 1:
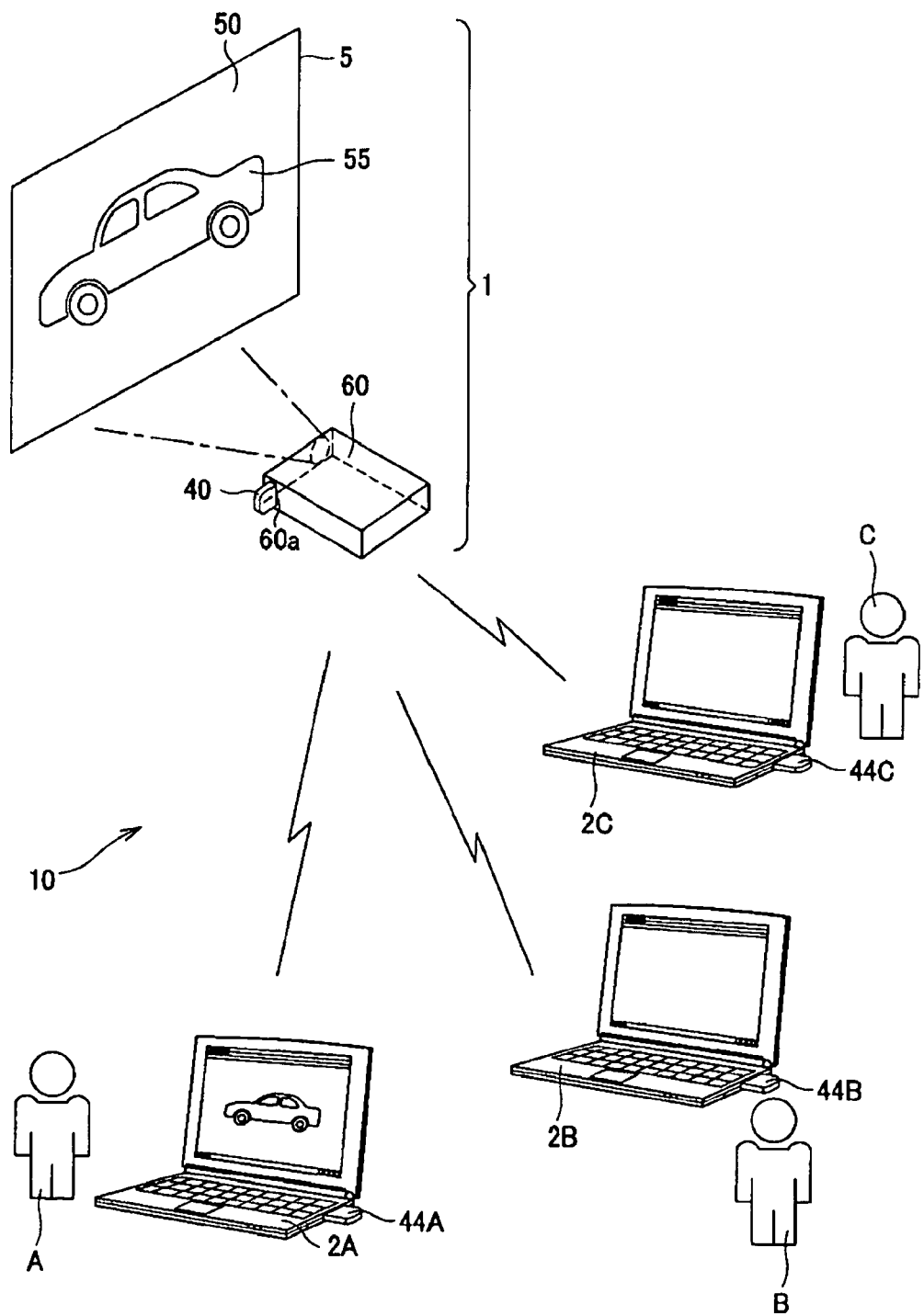
FIG. 1 is a basic configuration diagram of an image display system.

FIG. 1 is a diagram showing a basic configuration of an image display system 10. The image display system 10 is a system that makes up a wireless network by connecting an image display apparatus 1 and three information terminal apparatuses 2A, 2B and 2C to a wireless communications channel. It should be noted that the image display system 10 is merely an example, and the configuration of the present invention is not to be limited by this one example. There may be one information terminal apparatus, or there may be more.

The wireless communications channel is one that utilizes a transmission path other than a wire cable, such as radio waves and infrared rays. For example, there are wireless communications, such as those for Direct Sequence Spread Spectrum (DSSS) wireless communications, which utilize the 2.4 GHz ISM (Industrial, Scientific and Medical) band which is the same as that adopted in wireless LAN (WLAN) communications compliant with the IEEE 802.11 specifications. These are referred to as Bluetooth. In addition, there are those based on IrDA (Infrared Data Association), which is a specification for infrared data communications.

The image display apparatus 1 is comprised of a screen 5, which is an example of a display section, and an image projection apparatus (projector) that projects an image 55 onto a display screen 50 of the screen 5. A communications module 40, such as a wireless connection module, for example, is inserted into a slot 60a on the projector 60. This communications module 40 is for communicating with the three information terminal apparatuses 2A, 2B and 2C, and is used for transmitting and receiving request signals, response signals, rejection signals and the like for connecting or disconnecting. In addition, the module 40 is used for receiving image information that is sent from the three information terminal apparatuses 2A, 2B and 2C via the wireless network.

The three information terminal apparatuses 2A, 2B and 2C may be, for example, personal computers (PCs). Communications modules 44A, 44B and 44C, such as wireless connection modules, are also attached to the body of the information terminal apparatuses 2A, 2B and 2C, respectively, via a slot. These communications modules 44A, 44B and 44C are also used for transmitting and receiving request signals, response signals, rejection signals and the like for the connection and disconnection of communications with the communications module 40 of the projector 60. In addition, they are also used for transmitting image information to the projector 60. Needless to say, so long as the information terminal apparatuses are capable of having communications means, such as the above-mentioned communications module 44, mounted thereon and have functions of transmitting images, they need not be PCs. For example, they may be portable information terminals (PDAs), mobile phones, digital cameras and the like.

Figure 2:
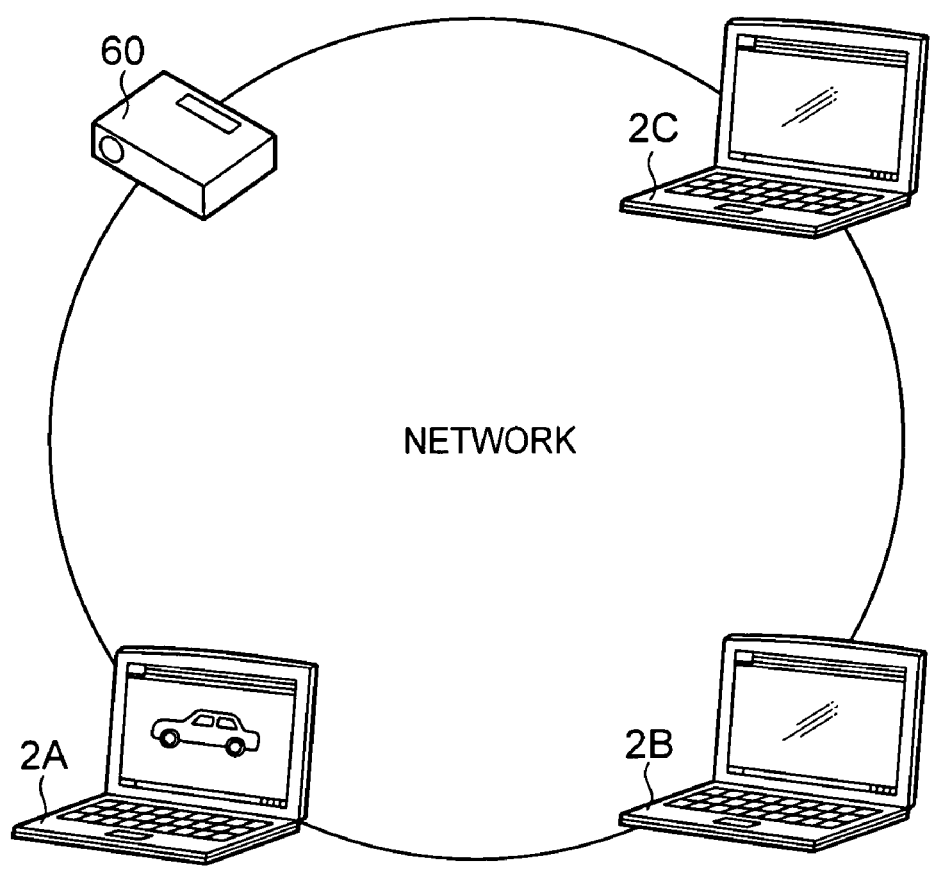
FIG. 2 is a diagram schematically showing a wireless network system comprised of a projector of an image display apparatus and three information terminal apparatuses.

FIG. 2 is a diagram schematically showing a wireless network system including the projector 60 and the three information terminal apparatuses 2A, 2B and 2C.

The information terminal apparatus 2A, for example, encrypts image information that is to be projected and displayed on the screen 5 by the projector 60 of the image display apparatus 1 and transmits it to the communications module 40 of the projector 60 through the communications module 44A. The same applies to the information terminal apparatuses 2B and 2C. The projector 60 of the image display apparatus 1 receives, through the communications module 40, the above-mentioned encrypted image information wirelessly transmitted from the information terminal apparatus 2A via the above-mentioned wireless communications channel, and projects it onto the display screen 50 of the screen 5 as an enlarged image 55 after converting it into decrypted image information.

Figure 3:
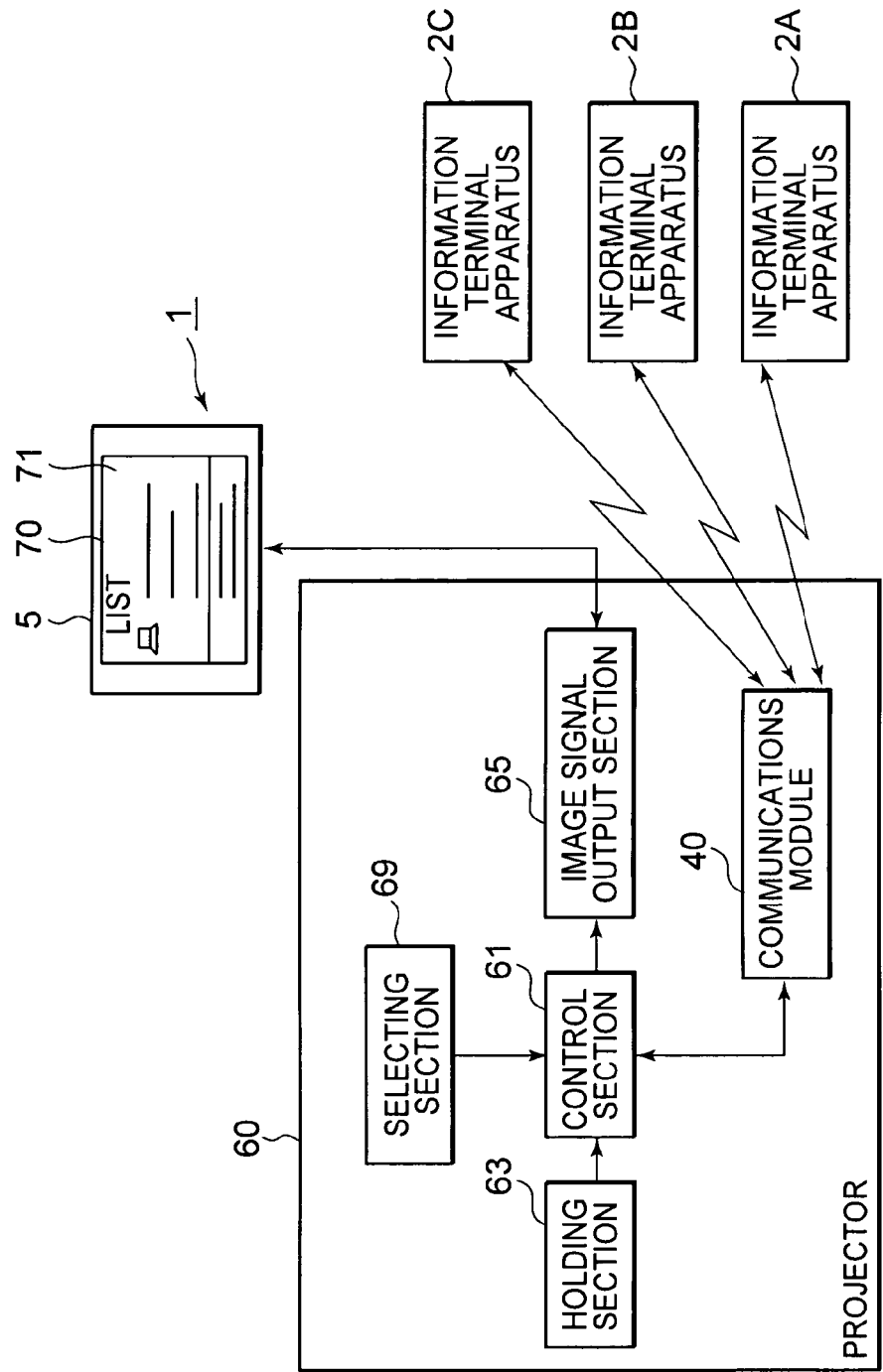
FIG. 3 is a block diagram schematically showing a configuration of an image display apparatus.

FIG. 3 is a block diagram schematically showing a configuration of the image display apparatus 1. The image display apparatus 1 is comprised of the screen 5 and the projector 60, receives, through the communications module 40, such as a wireless connection module, image information that is sent from the above-mentioned three information terminal apparatuses 2A, 2B and 2C via the network, and displays an image based on the image information on the screen 5.

The projector 60 is comprised of a holding section 63, a control section 61, a selecting section 69, an image signal output section 65 and the above-mentioned communications module 40.

The holding section 63 stores, in advance, information of information terminal apparatuses whose connection to the wireless network is desired. In the example shown in FIG. 3, it stores information of the information terminal apparatuses 2A, 2B and 2C in advance. The control section 61 reads the information of the information terminal apparatuses held by the holding section 63. The image signal output section 65 generates an image signal for displaying on the screen 5, as a list 71, the information of the information terminal apparatuses that is read by the control section 61. The selecting section 69 selects one information terminal apparatus from the list 71 displayed on the screen 5.

The control section 61 generates a connection request signal with respect to the information terminal apparatus selected by the selecting section 69. The communications module 40 transmits the above-mentioned connection request signal from the control section 61 to the appropriate information terminal apparatus 2A, 2B or 2C.

In other words, according to the image display apparatus 1, the image signal output section 65 generates the image signal for displaying on the screen 5 as the list 71 the information of the information terminal apparatuses read from the holding section 63 by the control section 61, the control section 61 generates the connection request signal with respect to the information terminal apparatus selected by the selecting section 69 from the list 71 displayed on the screen 5 based on the above-mentioned image signal, and the communications module 40 transmits the above-mentioned connection request signal.

The selected information terminal apparatus transmits the above-mentioned image information after transmitting an acceptance response signal in response to the above-mentioned connection request signal.

Therefore, the image display system 10 is capable of, from the side of the image display apparatus 1, switching among the plurality of networked information terminal apparatuses and selecting the desired information terminal apparatus therefrom, and of displaying on the screen 5 of the image display apparatus 1 the image information from the desired information terminal apparatus.

By adopting the block configuration above, it may be said that the image display apparatus 1 executes the image display method below. The image display method discussed herein is comprised of a holding step that stores and holds, in advance, of one or more information terminal apparatuses, information of that/those whose connection to a network is desired, a reading step that reads the information of the information terminal apparatuses held in the above-mentioned holding step, a displaying step that displays, as a list, the information of the information terminal apparatuses that are read, a selecting step that selects one information terminal apparatus from the displayed list, and a step that generates and transmits a connection request signal with respect to the selected information terminal apparatus.

Figure 4:
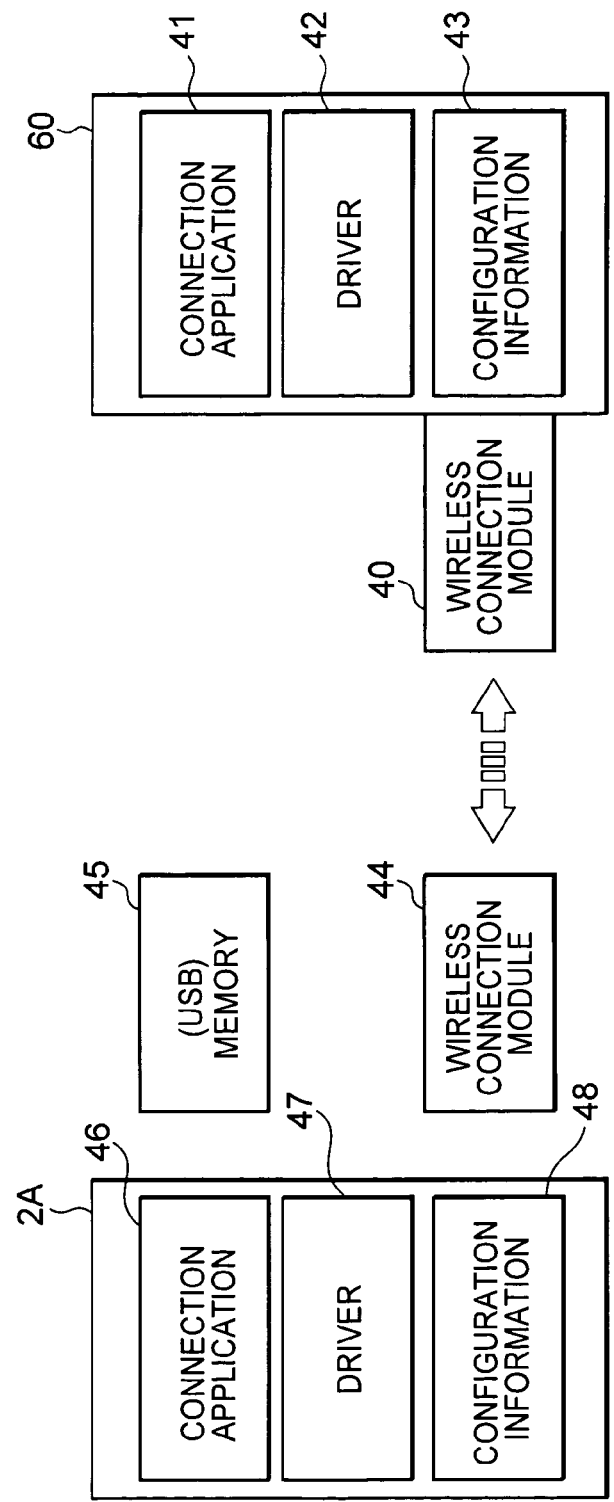
FIG. 4 is a system configuration diagram of software used by an image display apparatus and an information terminal apparatus of a hardware configuration.

As will be described later, the image information apparatus 1 whose configuration is shown in FIG. 3 and each of the information terminal apparatuses 2A through 2C adopt a hardware configuration that centers around a CPU (Central Processing Unit). A system configuration of software that is necessary for the hardware configuration of the image display apparatus 1 and the information terminal apparatus 2A is shown in FIG. 4. It is used in setting the connection configuration for the wireless network, or in transmitting and receiving image information and other control signals and the like via the wireless network.

The image display apparatus 1 has, in advance at the time of shipment, a connection application 41 for network connection, a driver 42 for driving the wireless connection module, and configuration information 43 for network connection written within a ROM, which will be described later. In addition, the image display apparatus 1 comes with the wireless connection module 40 as an accessory.

This wireless connection module 40 may be of a CF (Compact Flash) card type including an antenna and a transmission/reception chip, and may be used by inserting it into a dedicated slot 60a provided on the projector 60 of the image display apparatus 1. More specifically, transmission data is sent from a CPU described later to a baseband processing section via a communications control section or an I/F section, signal processed at the baseband processing section, impressed upon a carrier wave at an RF processing section, and wirelessly transmitted to a device in its vicinity from the wireless communications antenna. On the other hand, radio waves wirelessly transmitted from devices in the vicinity are communicated to the CPU described later via the communications control section or the I/F section after being received by the local wireless communications antenna, having signals extracted at the RF processing section, and being signal processed at the baseband signal processing section.

The connection application 41 is executed by the CPU described later and carries out connection to the wireless network and the transfer of images using the driver 42 and the configuration information 43.

The image display apparatus 1 may come with the wireless connection module 44 of a USB (Universal Serial Bus) type, for the information terminal apparatus 2A, having functions similar to those of the wireless connection module 40. In addition, the image display apparatus 1 may come with a USB memory 45 in which a connection application 46, a driver 47 and configuration information 48 similar to the above-mentioned connection application 41, driver 42 and configuration information 43 are stored.

In order to connect the projector 60 of the image display apparatus 1 and the information terminal apparatus 2A to the wireless network, the user clicks on a set-up file with a mouse after plugging the USB memory 45 in a USB jack on the information terminal apparatus 2A. As a result, an installer will automatically be activated on the information terminal apparatus 2A, and the connection application 46, the driver 47 and the configuration information 48 will automatically be stored in the HDD (Hard Disk Drive). Then, if the user inserts the wireless connection module 44 into the USB jack (slot) on the information terminal apparatus 2A, connection configuration for the wireless network will be completed, and transmission and reception of data with the projector 60 of the image display apparatus 1 that is already running will be carried out via the wireless network.

The configuration information 43 and 48 are configuration information for carrying out wireless network connection. FIG. 5 is a diagram showing an example of the configuration information 43 and 48. Configuration information items 7 and configuration information contents 8 are shown. Network mode of the configuration information items 7 is configuration information that differentiates between a mode for connecting to an access point (access point connection mode) and a mode for connecting one-on-one with a given device (ad hoc mode). For the kind of connection shown in FIG. 1, this item is set to ad hoc mode. Network name (SSID) is the name of the network, and is a unique name for the image display apparatus 1. Here, it is PJ-005. A reference "005" is a serial number. Network channel indicates the frequency band used. For example, it may be a channel varying from "1" and "11" Encryption of data (WEP) is information specifying the method of encryption for protecting data from any risk of interception since the present system constitutes a wireless network. The network mode, network name, network channel and method of data encryption mentioned above are information relating to the configuration of the wireless connection modules 40 and 44.

In addition, IP address (Internet Protocol Address) of the configuration information items 7 would normally represent a series of numbers corresponding to the address of a computer connected to the Internet. Here, it indicates the address, within the network, of the projector 60 of the image display apparatus 1 and of the information terminal apparatus 2A. For example, in the configuration information 48 for the information terminal apparatus 2A, it would be auto IP (DHCP). The projector 60 of the image display apparatus 1 is not a DHCP server of the wireless network, but since there is no configuration item corresponding to auto IP to begin with, by setting it to DHCP, a flow is established where a DHCP server is searched for, and once it is identified that there is none, auto IP operates. Subnet mask is a bit string for dividing subnets in an IP network. A network address is obtained by a logical AND operation of an IP address and a subnet mask.

With respect to the projector 60 of the image display apparatus 1, the configuration information 43 is already stored in the ROM along with the connection application 41 and the driver 42 at the time of purchase of the projector 60. With respect to the information terminal apparatus 2A, the configuration information 48, as described above, is installed in the HDD or the like from the USB memory 45 along with the connection application 46 and the driver 47.

Of these configuration information 43 and configuration information 48, information necessary for wireless network connection, that is, information relating to the configuration of the wireless connection modules 40 and 44, is created from information unique to the projector 60 of the image display apparatus 1, for example, its serial number and the like. For example, the network name "PJ-005" shown in the above-mentioned FIG. 5 is created from the serial number "00005" that is unique to the projector 60 of the image display apparatus 1. In addition, a reference code "382654 . . . ," which is the data encryption method (WEP), is also a 128-bit encryption key generated from the above-mentioned unique serial number.

Summarizing the above, the network name and the data encryption key in the configuration information 43 and 48 are determined from information unique to the projector 60 of the image display apparatus 1, and these information, along with other configuration information, are, at the time of factory shipment, written in the ROM within the projector 60 of the image display apparatus 1 and in the USB memory 45.

The information terminal apparatuses 2B and 2C are connected to the wireless network in a manner similar to the information terminal apparatus 2A. However, the USB memories 45 and wireless connection modules 44 for the information terminal apparatuses 2B and 2C come with the projector 60 of the image display apparatus 1 at the time of purchase. Naturally, the user may also purchase the USB modules and the wireless connection modules at a later date. Of the configuration information 48 pre-stored in a plurality of USB memories 45, all of the information relating to the configuration of the wireless connection module 44 shown in FIG. 5 is generated from information that is unique to the projector 60 of the image display apparatus 1. Therefore, information relating to the configuration of the wireless connection module 44 would be the same for a plurality of information terminal apparatuses. Of the configuration information 48, the remaining IP address and subnet mask relating to the information terminal apparatuses are data unique to each of the information terminal apparatuses. The projector 60 of the image display apparatus 1 has a fixed IP address, but as for the plurality of information terminal apparatuses, by virtue of the auto IP function, IP addresses are allocated automatically. When the IP address changes, the subnet mask automatically changes as well.

Thus, by simply inserting the plurality of USB memories 45, which are included at the time of purchase, into the respective USB jacks of the plurality of information terminal apparatuses 2A, 2B and 2C, carrying out a predetermined installation operation, and inserting the plurality of wireless connection modules 44 into the respective other USB jacks, the user of the image display apparatus 1 may connect the image display apparatus 1 and the plurality of information terminal apparatuses 2A, 2B and 2C to the wireless network.

In addition, of the configuration information shown in FIG. 5, the network name and WEP key, which are information necessary for wireless network connection, are, in particular, generated in advance from the serial number unique to the projector 60 of the image display apparatus 1. Also, by using the configuration method mentioned above, they are automatically set in the plurality of information terminal apparatuses 2A, 2B and 2C, and thus, no display on the screen 5 is necessary as is conventional. For this reason, since the configuration information is not exposed to a third party, unauthorized entry into or attacks on the network by third parties can be prevented, and, naturally, since unauthorized decryption of encrypted data can also be prevented, security is ensured.

Figure 6:
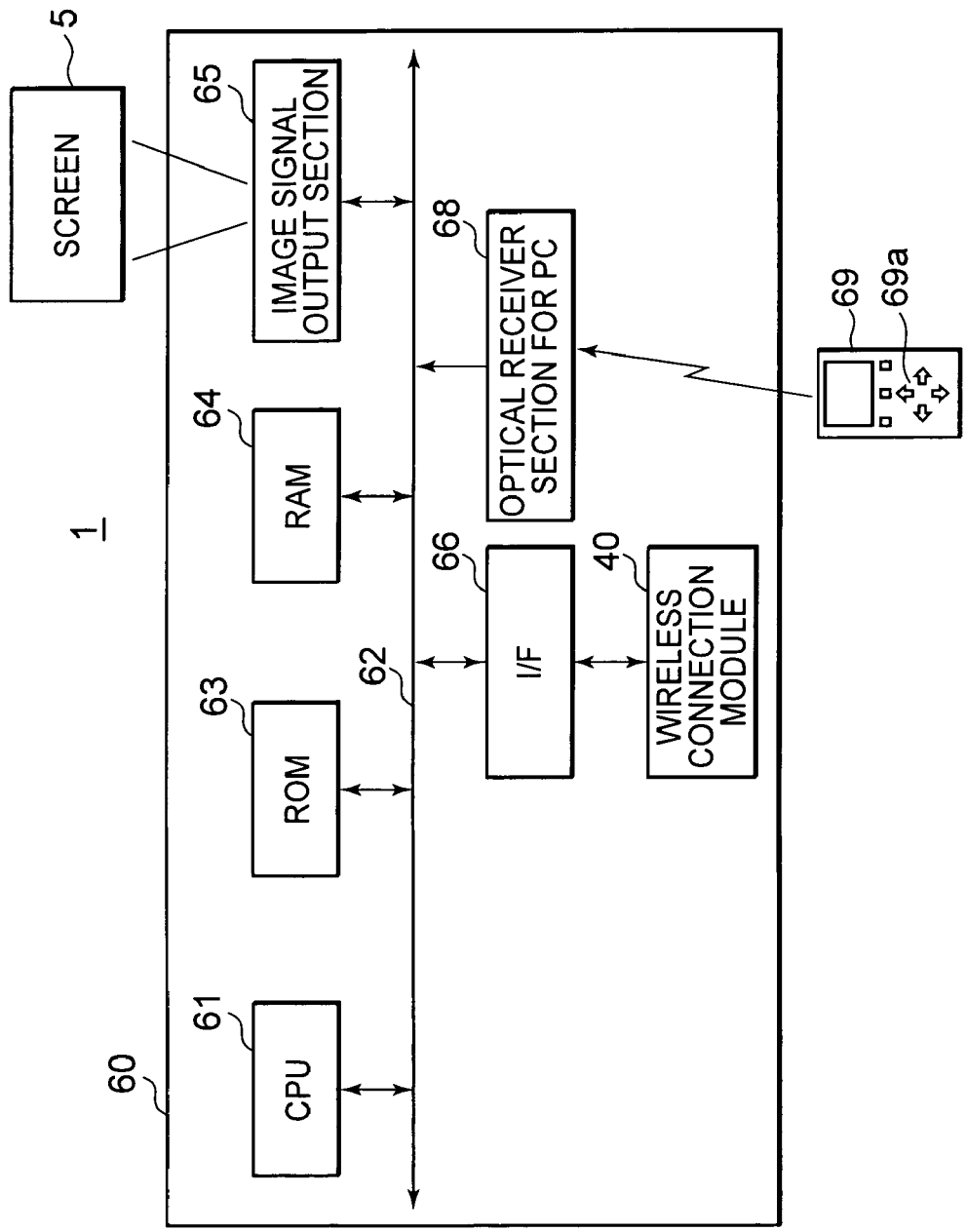
FIG. 6 is a block diagram showing a hardware configuration of an image display apparatus.

FIG. 6 is a diagram showing a hardware configuration of the image display apparatus 1. A read only memory (ROM) 63 and a random access memory (RAM) 64 are connected to a CPU 61 via a bus 62. In addition, the image signal output section 65 that projects image signals onto the screen 5, an I/F (Interface) 66, such as PCMCIA (Personal Computer Memory Card International Association), that interfaces the wireless connection module 40, and further a remote control optical receiver section 68 are also connected to the CPU 61 via the bus 62. The remote control optical receiver section 68 receives remote control signals from a remote controller 69. The connection application 41, the driver 42 and the configuration information 43 are already stored in the ROM 63 at the time of shipment.

The screen 5 is comparable to the screen 5 shown in FIG. 3. Similarly, the wireless connection module 40 is an example of the communications module 40 shown in FIG. 3. The ROM 63 or the RAM 64 is an example of the holding section 63 shown in FIG. 3, and stores in advance information of the information terminal apparatuses whose connection to the wireless network is desired. Similarly, the CPU 61 is an example of the control section 61, and reads the information of the information terminal apparatuses held by the ROM 63 or the RAM 64. The image signal output section 65 is similar to the one shown in FIG. 3, and generates image signals for displaying, as the list 71, on the screen 5 the information of the information terminal apparatuses read by the CPU 61.

The remote controller 69 is an example of the selecting section 69 shown in FIG. 3, and selects one information terminal apparatus from the list 71 displayed on the screen 5. In addition, using the remote controller 69, operations such as configuring the connection to the wireless network, switching the connection and disconnection with the plurality of information terminal apparatuses, and so forth are performed.

As described above, since the remote control optical receiver section 68 is provided on the image display apparatus 1, infrared remote control signals from the remote controller 69 can be received.

In accordance with remote control signals received by the remote control optical receiver section 68, the CPU 61 references, for example, a data table, which is stored in the ROM 63 or the RAM 64, for interpreting the remote control signals and interprets commands. For example, if a user, using the remote controller 69, selects the desired information terminal apparatus and requests connection, the CPU 61 generates a connection request signal with respect to the selected information terminal apparatus, and sends it to the wireless connection module 44 of the appropriate information terminal apparatus from the wireless connection module 40 via the I/F 66. Thus, it becomes possible to configure wireless network connection.

In addition, when operations for switching or disconnecting information terminal apparatuses are performed by the user using the remote controller 69, the CPU 61 interprets the command, generates the respective transmission signals corresponding to the command, and sends them to the wireless connection module 44 of the appropriate information terminal apparatus from the wireless connection module 40 via the I/F 66. Thus, the switching and disconnecting of information terminal apparatuses become possible through operations on the side of the image display apparatus 1.

In addition, the remote controller 69 is capable of controlling, through remote operations and through the image display apparatus 1, the fast forwarding/rewinding of the image displayed on the display section of the selected and connected information terminal apparatus 2. In this case, too, when the projector 60 of the image display apparatus 1 receives the infrared remote control signal from the remote controller 69 through the remote control optical receiver section 68, the CPU 61 references, for example, the table, which is stored in the ROM 63 or the RAM 64, for interpreting the remote control signals and interprets the command, the CPU 61 generates the respective transmission control data corresponding to the command, and sends the respective transmission control data from the wireless connection module 40 to the wireless connection module 44 of the information terminal apparatus 2 via the I/F 66. The information terminal apparatus 2 interprets the control data for fast forwarding/rewinding images, which is received through the wireless connection module 44, and fast forwards/rewinds the image information displayed on its display section. In conjunction therewith, the image projected onto the screen 5 of the image display apparatus 1 is also fast forwarded/rewound.

With the remote controller 69, it is further possible to perform such control as making the screen 5 of the image display apparatus 5 black. In addition, the remote controller 69 may be given laser pointer functions.

In addition, the process of fast forwarding/rewinding the image on the information terminal apparatus 2, the function of performing the control whereby the screen 5 is turned black, and the laser pointer function may be isolated from the remote controller 69 to provide a dedicated presentation tool.

Figure 7:
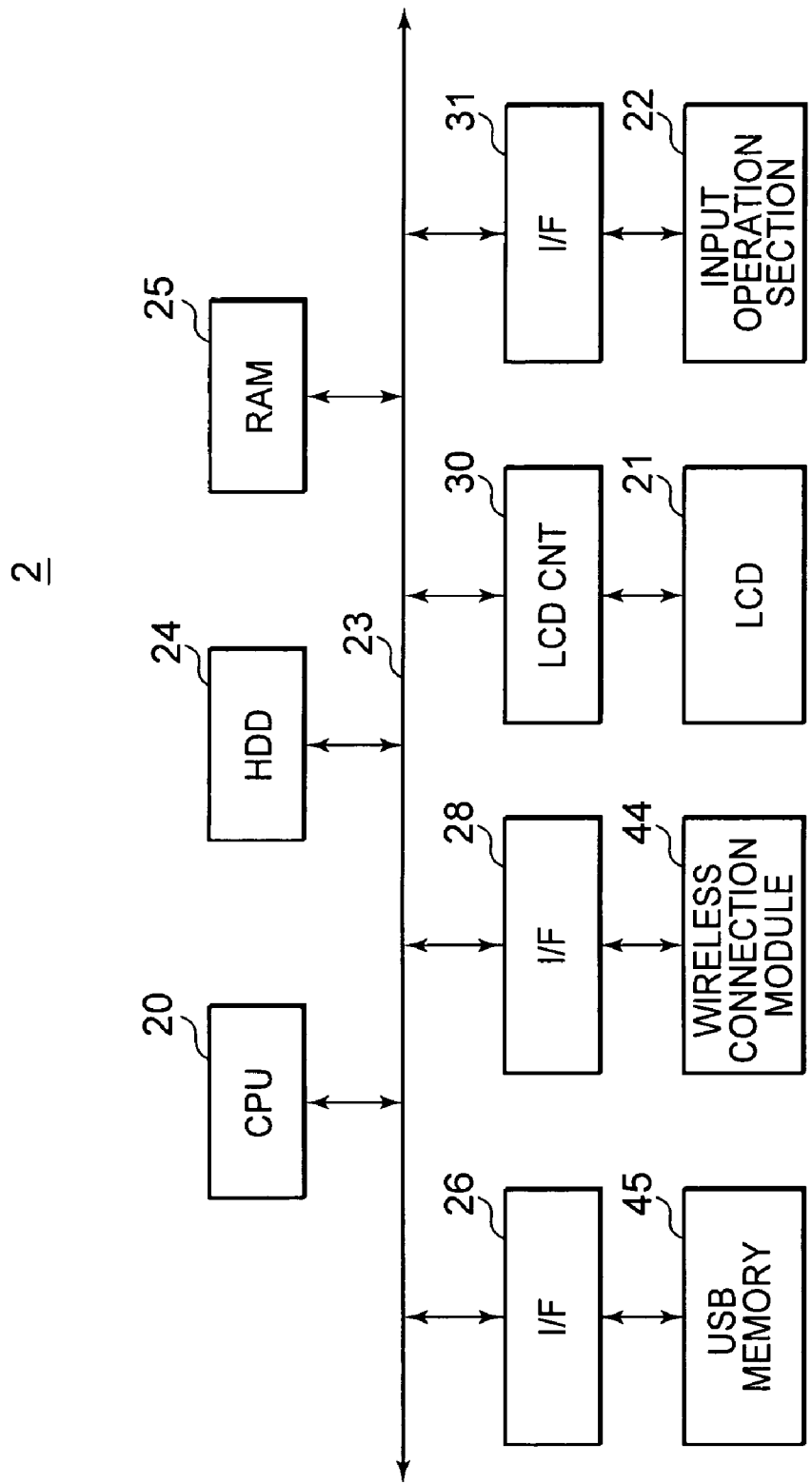
FIG. 7 is a block diagram showing a hardware configuration of an information terminal apparatus.

FIG. 7 is a diagram showing a hardware configuration of the information terminal apparatus 2A (2B and 2C are also similar). A hard disk drive (HDD) 24 and a random access memory (RAM) 25 are connected to a CPU 20 via a bus 23. In addition, a USB I/F 26 for interfacing the USB memory 45 and an I/F 28 for interfacing the wireless connection module 44 are connected to the CPU 20 via the bus 23. Further, an LCD controller 30 for controlling a liquid crystal display apparatus LCD 21 which is the above-mentioned display section of its own, and an I/F 31 for interfacing an input operation section 22 such as a keyboard or a mouse are connected to the CPU 20 via the bus 23. In addition, it is assumed that image information to be sent out to the image display apparatus 1 is selected and displayed on the liquid crystal display apparatus LCD 21.

When the above-mentioned connection request signal or the transmission signal for switching or disconnection are sent from the side of the image display apparatus 1, at the information terminal apparatus 2A, each transmission signal received by the wireless connection module 44 is handed over to the CPU 20 via the I/F 28, and is processed by the CPU 20. The processing of transmission signals to the image display apparatus 1 from the information terminal apparatus 2A is performed in a similar fashion.

Below, an operation of the image display system 10 comprised of the image display apparatus 1 of the hardware configuration shown in FIG. 6 and the information terminal apparatus 2A of the hardware configuration shown in FIG. 7 is described.

It is assumed that operations and configuration for connecting the projector 60 of the image display apparatus 1 and the information terminal apparatus 2A to the wireless network are already completed by the user. In other words, the user has inserted the USB memory 45 into the USB jack on the information terminal apparatus 2A, an installer has been activated automatically on the information terminal apparatus 2A by clicking on the setup file using a mouse, and the connection application 46, the driver 47 and the configuration information 48 have automatically been stored in the HDD 24. Then, as the user inserts the wireless connection module 44 into the PC card slot on the information terminal apparatus 2A, configuration for connecting to the wireless network is completed, and it becomes possible to transmit and receive data to and from the projector 60 of the image display apparatus 1, which is already running, via the wireless network.

Figure 8:
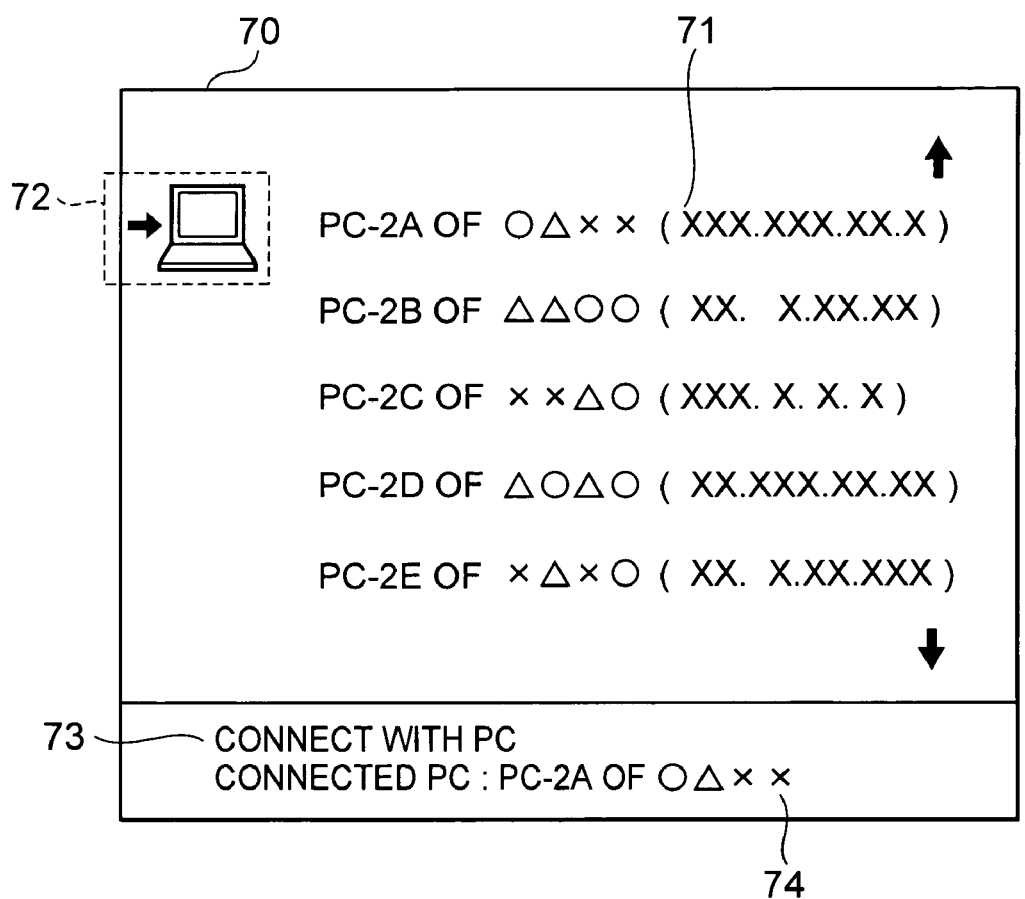
FIG. 8 is a diagram showing a PC selection screen.

First, assuming the user presses a predetermined key (a wireless connection function key) on the operation section of the remote controller 69 shown in FIG. 6, then, as shown in FIG. 8, the list 71 of the information terminal apparatuses 2A, 2B, 2C . . . that are connectable is displayed within a PC selection screen 70. The PC selection screen 70 may be displayed on a portion of the screen or displayed on the entire screen.

When the user selects from the list 71 the information terminal apparatus s/he wants to connect with by pressing the up or down selection key on the operation section of the remote controller 69 and presses the confirm (enter) key, the image display apparatus 1 connects with the selected information terminal apparatus. On the list 71 within the PC selection screen 70 of FIG. 8, PC-2A of user "O∆xx" is selected. During connection, a connection mark 72 is displayed to the left of the selected [PC-2A of user "O∆xx"]. In addition, guidance as to which PC is currently connected is also displayed on a PC connection guidance display section 73. Here, it is displayed as [PC-2A of user "O∆xx"] 74.

In order to disconnect, the information terminal apparatus to be disconnected may be selected by pressing the up or down selection key on the operation section of the remote controller 69, and the enter key pressed.

Next, several examples of operations performed by the image display apparatus 1 in accordance with operations by the user using the above-mentioned PC selection screen 70 will be described with reference to FIG. 9 through FIG. 15. In FIG. 9 through FIG. 15, the sequence states of the projector 60 of the image display apparatus 1 and personal computers (PCs) 2A and 2B are shown. However, in the description below, the sequential states are described treating the personal computers (PCs) 2A and 2B as the same as the information terminal apparatuses 2A and 2B.

There exist a connected state and a disconnected state for the image display apparatus 1 and the information terminal apparatus 2. Below, processes according to those states will be described.

First, with reference to FIG. 9 and FIG. 10, a case where the state of the image display apparatus 1 and the information terminal apparatus 2 changes from disconnection will be described. The user displays the PC selection screen 70 on the screen 5 of the image display apparatus 1 by the above-mentioned predetermined key operation on the remote controller 69. Further, the user selects the information terminal apparatus to connect with by pressing the up or down selection key on the remote controller 69, and confirms the information terminal apparatus to connect with by pressing the confirm (enter) key.

Figure 9:
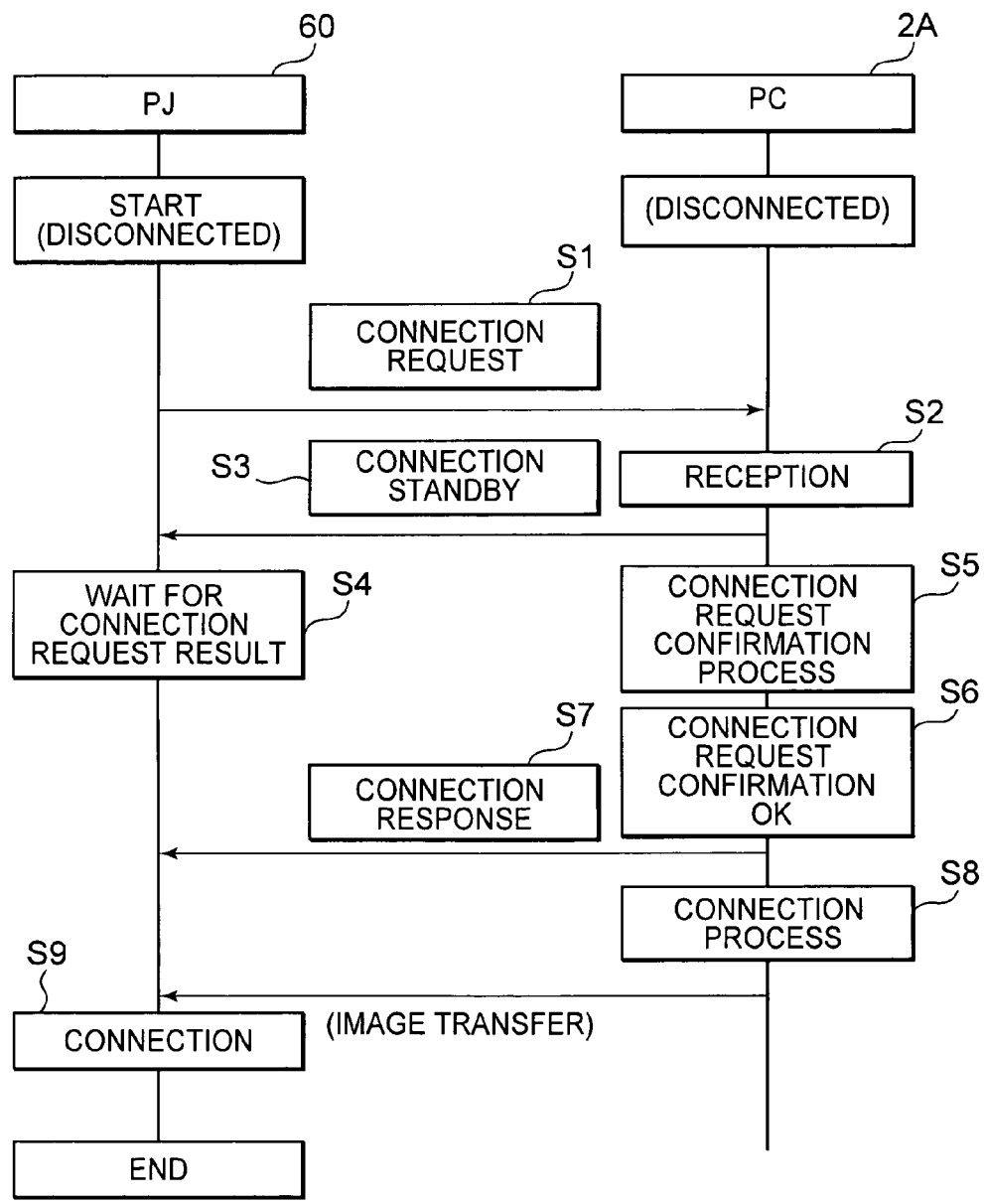
FIG. 9 is a sequence diagram of a case where a disconnected information terminal apparatus accepts a connection request from an image display apparatus.

FIG. 9 is a sequence diagram of a case where the information terminal apparatus 2A accepts a connection request from the projector 60 of the image display apparatus 1. In the sequence diagram of FIG. 9, the connection request signal generated by the CPU 61 of the projector 60 of the image display apparatus 1 with respect to the information terminal apparatus 2A selected by the remote controller 69 is handed over to the wireless connection module 40 via the I/F 66, and is transmitted from the wireless connection module 40 to the wireless connection module 44 of the appropriate information terminal apparatus 2A in step S1.

The information terminal apparatus 2A to which the connection request signal is sent in the above-mentioned step S1 receives the connection request signal by the wireless connection module 44 in step S2. The CPU 20 of the information terminal apparatus 2A receives via the I/F 28 the connection request signal received by the wireless connection module 44. Then, the CPU 20 generates a connection standby signal, and hands it over to the wireless connection module 44 via the I/F 28. The wireless connection module 44 transmits the connection standby signal to the wireless connection module 40 of the projector 60 in step S3.

Once the CPU 61 of the projector 60 interprets the above-mentioned connection standby signal received by the wireless connection module 40, a connection request result waiting state is entered in step S4.

After transmitting the above-mentioned connection standby signal, the information terminal apparatus 2A performs a connection request confirmation process at the CPU 20 in step S5, and determines whether or not it is currently possible to connect with the projector 60.

If, from this determination in step S5, the CPU 20 determines that connection is possible, the fact that the above-mentioned connection request should be accepted is decided as connection request confirmation OK in step S6. The CPU 20, based on the decision of connection request confirmation OK, generates a connection response signal, which is an acceptance response signal, and hands it over to the wireless connection module 44 via the I/F 28. The wireless connection module 44 transmits the above-mentioned connection response signal to the wireless connection module 40 of the projector 60 in step S7.

Then, the information terminal apparatus 2A and the projector 60 are connected once the CPU 20 of the information terminal apparatus 2A executes a connection process in step S8. As a result, the CPU 20 of the selected information terminal apparatus 2A transmits the image information signal displayed on the liquid crystal display apparatus 21 to the wireless connection module 40 of the projector 60 from the wireless connection module 44 via the I/F 28.

The wireless connection module 40 of the projector 60 receives the image information transmitted from the information terminal apparatus 2A. The CPU 61 receives the above-mentioned image information via the I/F 66, and based thereon, makes image signals based on the above-mentioned image information be output by the image signal output section 65, and projects and displays the image from the information terminal apparatus 2A on the screen 5. Then, in step S9, on the side of the projector 60, connection is established.

Thus, the wireless connection module 40, which is the communications means of the image display apparatus 1, transmits the connection request signal generated by the CPU 61 to the information terminal apparatus 2A, and receives the above-mentioned image information after receiving the acceptance response signal from the information terminal apparatus 2A.

Figure 10:
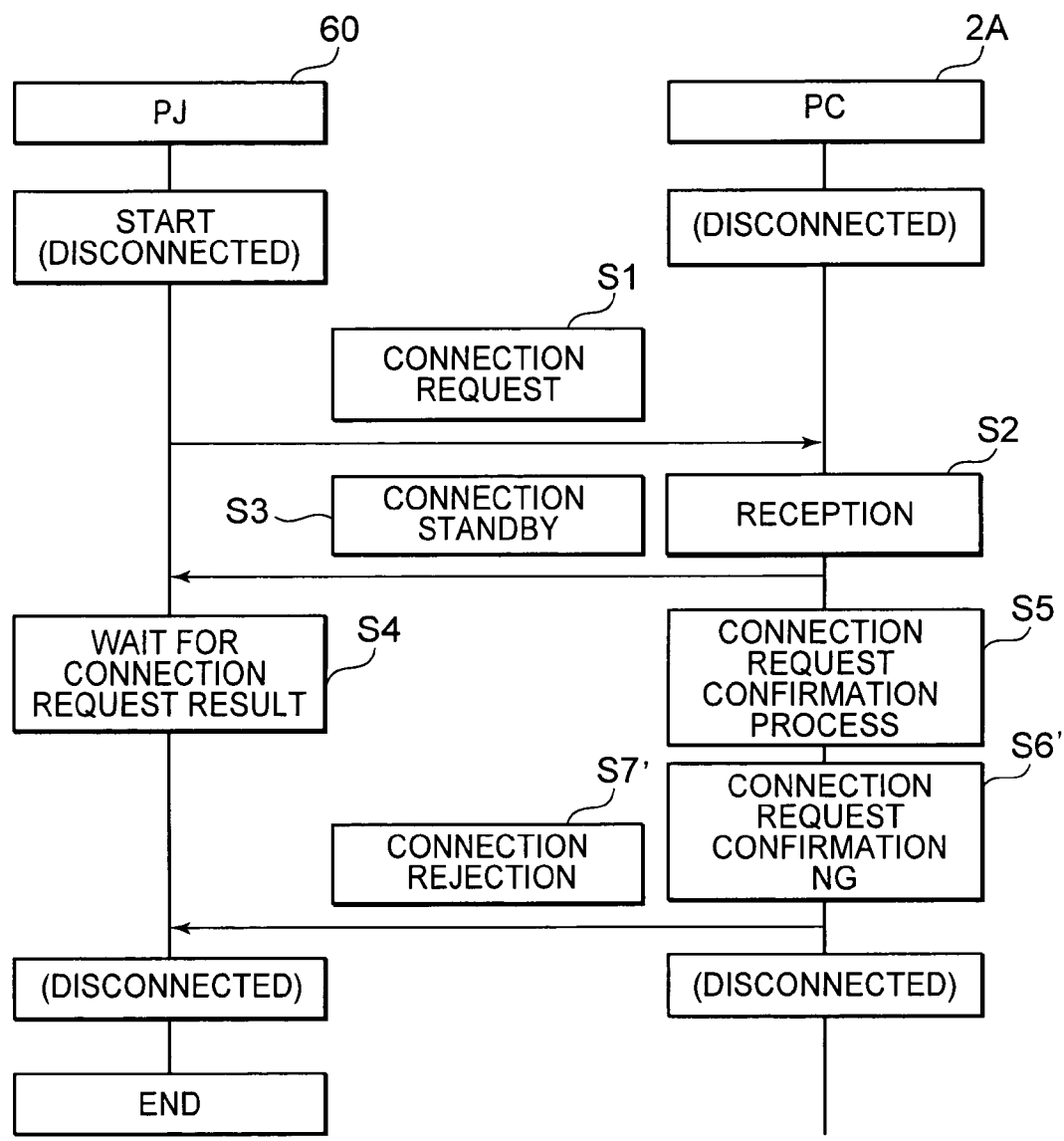
FIG. 10 is a sequence diagram of a case where a disconnected information terminal apparatus rejects a connection request from an image display apparatus.

In addition, as shown in FIG. 10, the information terminal apparatus 2A is also capable of rejecting a connection request from the projector 60 of the image display apparatus 1. In the sequence diagram of FIG. 10, the connection request signal generated by the CPU 61 of the projector 60 with respect to the information terminal apparatus 2A selected by the remote controller 69 is handed over to the wireless connection module 40 via the I/F 66, and is transmitted from the wireless connection module 40 to the wireless connection module 44 of the appropriate information terminal apparatus 2A in step S1.

The information terminal apparatus 2A to which the connection request signal is sent in the above-mentioned step S1 receives the connection request signal through the wireless connection module 44 in step S2. The CPU 20 of the information terminal apparatus 2A receives via the I/F 28 the connection request signal received by the wireless connection module 44. Then, the CPU 20 generates a connection standby signal and hands it over to the wireless connection module 44 via the I/F 28. The wireless connection module 44 transmits the connection standby signal to the wireless connection module 40 of the projector 60 in step S3.

Once the CPU 61 of the projector 60 interprets the above-mentioned connection standby signal received by the wireless connection module 40, a connection request result waiting state is entered in step S4.

After transmitting the above-mentioned connection standby signal, the information terminal apparatus 2A performs a connection request confirmation process at the CPU 20 in step S5, and determines whether or not connection with the projector 60 is currently possible.

If, from this determination in step S5, the CPU 20 determines that connection is not possible, the fact that the above-mentioned connection request should be rejected is decided as connection request confirmation NG in step S6'. Based on the decision of connection request confirmation NC, the CPU 20 generates a connection rejection signal and hands it over to the wireless connection module 44 via the I/F 28. The wireless connection module 44 transmits the above-mentioned connection rejection signal to the wireless connection module 40 of the projector 60 in step S7'.

As a result, the projector 60 of the image display apparatus 1 goes on to maintain disconnection from waiting for the connection request result. In addition, the information terminal apparatus 2A also maintains disconnection. In this case, image transfer is not performed.

When the projector 60 of the image display apparatus 1 thus receives via the wireless connection module 40 the connection rejection signal from the information terminal apparatus 2A selected by the remote controller 69, the CPU 61 does not perform the process of connecting with the selected information terminal apparatus 2A. In addition, at this point, the CPU 61 may control the image signal output section 65 so as to display, on the PC connection guidance display section 73 within the PC selection screen 70 shown in FIG. 8, the fact that the selected information terminal apparatus 2A cannot be connected as in "the information terminal apparatus 2A cannot be connected." In addition, the PC selection screen 70 may be closed automatically.

Next, with reference to FIG. 11 and FIG. 12, a case where the image display apparatus 1 and the information terminal apparatus 2 disconnect from a state of being in connection will be described. The user displays on the screen 5 of the image display apparatus 1 the PC selection screen 70 through the above-mentioned predetermined key operation on the remote controller 69. The user selects the information terminal apparatus to be disconnected by pressing the up or down selection key on the remote controller 69, and confirms the information terminal apparatus to be disconnected by pressing the confirm (enter) key.

Figure 11:
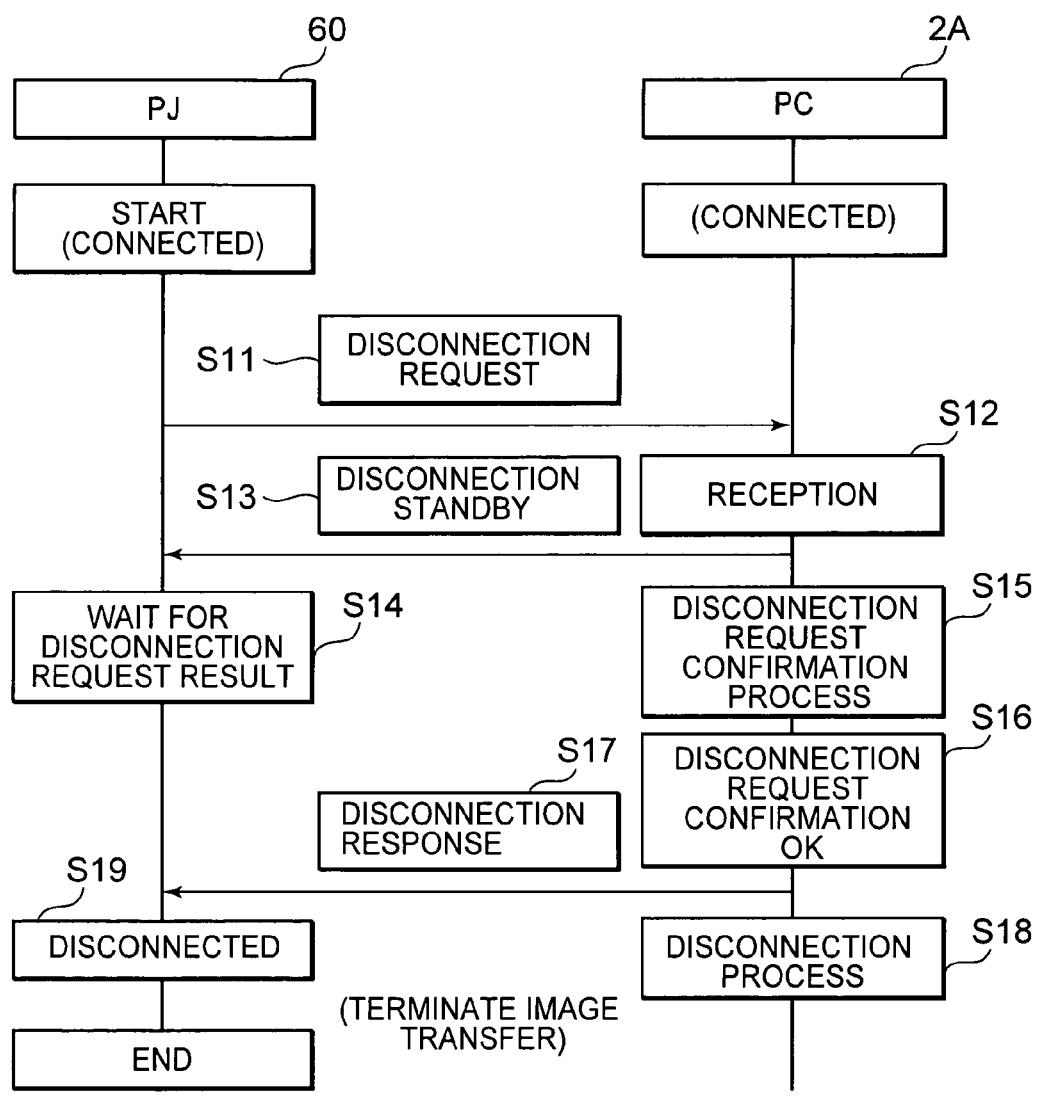
FIG. 11 is a sequence diagram of a case where a connected information terminal apparatus accepts a disconnection request from an image display apparatus.

FIG. 11 is a sequence diagram of a case where the information terminal apparatus 2A accepts a disconnection request from the projector 60 of the image display apparatus 1. In the sequence diagram of FIG. 11, the disconnection request signal generated by the CPU 61 of the projector 60 of the image display apparatus 1 with respect to the information terminal apparatus 2A to which the disconnection request has been issued by the remote controller 69 is handed over to the wireless connection module 40 via the I/F 66, and is transmitted from the wireless connection module 40 to the wireless connection module 44 of the appropriate information terminal apparatus 2A in step S11.

The information terminal apparatus 2A to which the disconnection request signal is sent in the above-mentioned step S11 receives the disconnection request signal through the wireless connection module 44 in step S12. The CPU 20 of the information terminal apparatus 2A receives via the I/F 28 the disconnection request signal received by the wireless connection module 44. The CPU 20 generates a disconnection standby signal, and hands it over to the wireless connection module 44 via the I/F 28. The wireless connection module 44 transmits the disconnection standby signal to the wireless connection module 40 of the projector 60 in step S13.

Once the CPU 61 of the projector 60 interprets the above-mentioned disconnection standby signal received by the wireless connection module 40, a disconnection request result waiting state is entered in step S14.

After transmitting the above-mentioned disconnection standby signal, the information terminal apparatus 2A performs a disconnection request confirmation process at the CPU 20 in step S15, and determines whether or not it is currently possible to disconnect from the projector 60.

If, from this determination in step S15, the CPU 20 determines that disconnection is possible, the fact that the above-mentioned disconnection request should be accepted is decided as disconnection request confirmation OK in step S16. The CPU 20, based on the decision of disconnection request confirmation OK, generates a disconnection response signal, and hands it over to the wireless connection module 44 via the I/F 28. The wireless connection module 44 transmits the above-mentioned disconnection response signal to the wireless connection module 40 of the projector 60 in step S17.

Then, the information terminal apparatus 2A and the projector 60 are disconnected once the CPU 20 of the information terminal apparatus 2A performs a disconnection process in step S18, the transfer of image information to the projector 60 from the information terminal apparatus 2A is terminated, and the projector 60 of the image display apparatus 1 finishes projecting and displaying on the screen 5 the image from the information terminal apparatus 2A. In step S19, the side of the projector 60 becomes disconnected.

Figure 12:
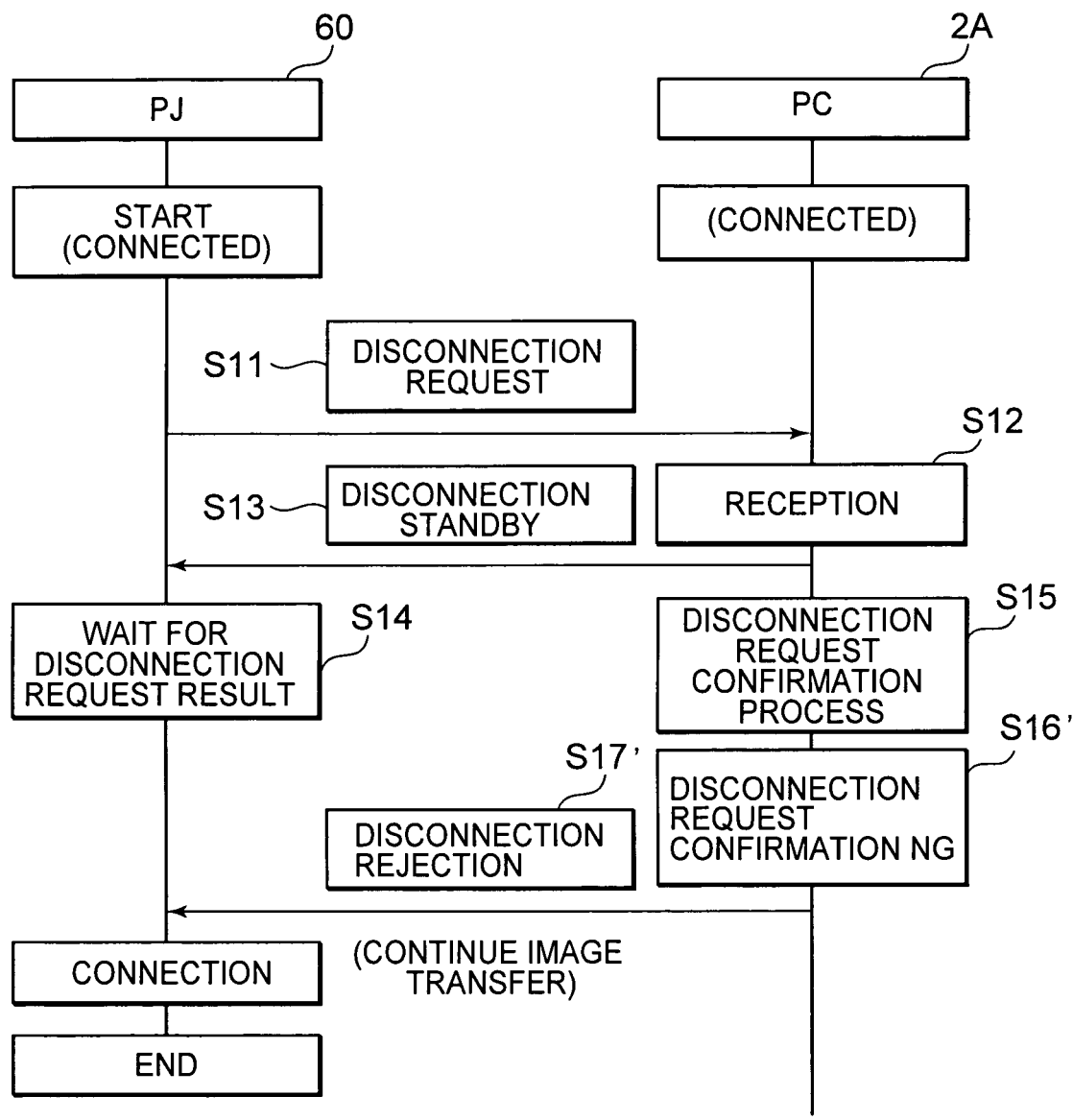
FIG. 12 is a sequence diagram of a case where a connected information terminal apparatus rejects a disconnection request from an image display apparatus.

In addition, as shown in FIG. 12, the information terminal apparatus 2A is also capable of rejecting a disconnection request from the projector 60 of the image display apparatus 1. In the sequence diagram of FIG. 12, the disconnection request signal generated by the CPU 61 of the projector 60 with respect to the information terminal apparatus 2A to which the disconnection request has been issued by the remote controller 69 is handed over to the wireless connection module 40 via the I/F 66, and is transmitted from the wireless connection module 40 to the wireless connection module 44 of the appropriate information terminal apparatus 2A in step S11.

The information terminal apparatus 2A to which the disconnection request signal is sent in the above-mentioned step S11 receives the disconnection request signal through the wireless connection module 44 in step S12. The CPU 20 of the information terminal apparatus 2A receives via the I/F 28 the disconnection request signal received by the wireless connection module 44. The CPU 20 generates a disconnection standby signal and hands it over to the wireless connection module 44 via the I/F 28. The wireless connection module 44 transmits the disconnection standby signal to the wireless connection module 40 of the projector 60 in step S13.

Once the CPU 61 of the projector 60 interprets the above-mentioned disconnection standby signal received by the wireless connection module 40, a disconnection request result waiting state is entered in step S14.

After transmitting the above-mentioned disconnection standby signal, the information terminal apparatus 2A performs a disconnection request confirmation process at the CPU 20 in step S15, and determines whether or not disconnection from the projector 60 is currently possible.

If, from this determination in step S15, the CPU 20 determines that disconnection is not possible, the fact that the above-mentioned disconnection request should be rejected is decided as disconnection request confirmation NG in step S16'. Based on the decision of disconnection request confirmation NG, the CPU 20 generates a disconnection rejection signal and hands it over to the wireless connection module 44 via the I/F 28. The wireless connection module 44 transmits the above-mentioned disconnection rejection signal to the wireless connection module 40 of the projector 60 in step S17'.

As a result, the projector 60 of the image display apparatus 1 goes on to maintain connection from waiting for the disconnection request result. The information terminal apparatus 2A continues the transfer of image information to the projector 60, and the projector 60 of the image display apparatus 1 continues to project and display on the screen 5 the image from the information terminal apparatus 2A. In addition, at this point, the CPU 61 may control the image signal output section 65 so as to display, on the PC connection guidance display section 73 within the PC selection screen 70 shown in FIG. 8, the fact that the information terminal apparatus 2A that was to be disconnected cannot be disconnected as in "the information terminal apparatus 2A cannot be disconnected." In addition, the PC selection screen 70 may be closed automatically.

Next, with reference to FIG. 13, FIG. 14 and FIG. 15, a case will be described where while the projector 60 of the image display apparatus 1 and the information terminal apparatus 2A are in a connected state, a disconnection request is issued to the currently connected information terminal apparatus 2A, and a connection request is issued to another information terminal apparatus 2B.

Figure 13:
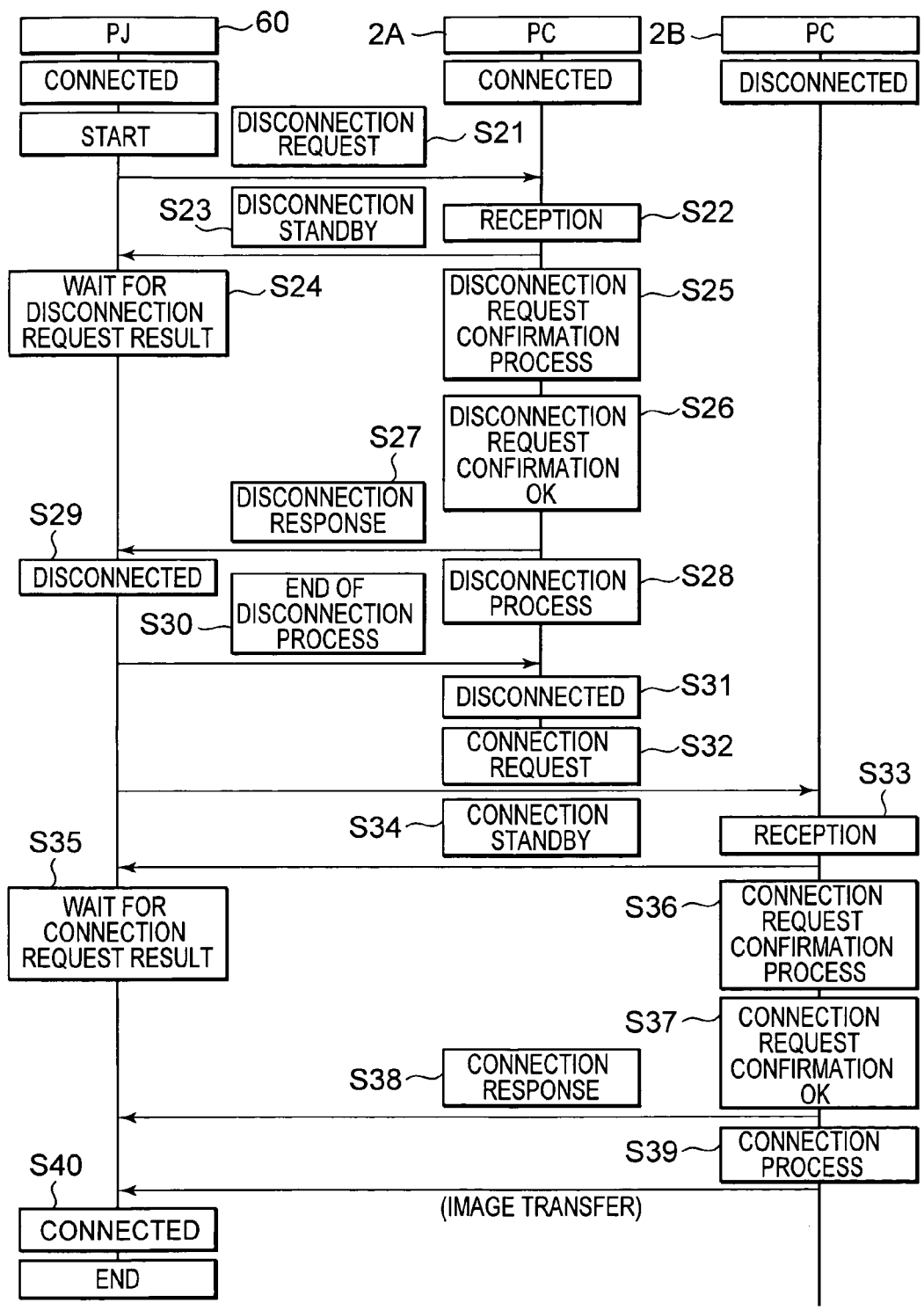
FIG. 13 is a sequence diagram of a case where a connected information terminal apparatus accepts a disconnection request from an image display apparatus and another information terminal apparatus accepts a connection request from the image display apparatus.

FIG. 13 is a sequence diagram of a case where the information terminal apparatus 2A accepts a disconnection request from the projector 60 of the image display apparatus 1, the information terminal apparatus 2B accepts a connection request from the above-mentioned projector 60, and the projector 60 of the image display apparatus 1 and the information terminal apparatus 2B are connected.

Using the remote controller 69, the PC selection screen 70 is displayed on the screen 5 of the image display apparatus 1. Using the remote controller 69, the user selects the information terminal apparatus 2B to which connection is to be switched. Then, the CPU 61 of the projector 60 of the image display apparatus 1 generates a disconnection request signal with respect to the currently connected information terminal apparatus 2A, hands it over to the wireless connection module 40 via the I/F 66, and transmits it from the wireless connection module 40 to the wireless connection module 44 of the appropriate information terminal apparatus 2A in step S21.

The information terminal apparatus 2A to which the disconnection request signal is sent in the above-mentioned step S21 receives the disconnection request signal through the wireless connection module 44 in step S22. The CPU 20 of the information terminal apparatus 2A receives via the I/F 28 the disconnection request signal received by the wireless connection module 44. The CPU 20 generates a disconnection standby signal and hands it over to the wireless connection module 44 via the I/F 28. The wireless connection module 44 transmits the disconnection standby signal to the wireless connection module 40 of the projector 60 in step S23.

Once the CPU 61 of the projector 60 receives the above-mentioned disconnection standby signal through the wireless connection module 40 and interprets it, a disconnection request result waiting state is entered in step S24.

After transmitting the above-mentioned disconnection standby signal, the information terminal apparatus 2A performs a disconnection request confirmation process at the CPU 20 in step S25, and determines whether or not it is currently possible to disconnect from the projector 60.

If, from this determination in step S25, the CPU 20 determines that disconnection is possible, the fact that the above-mentioned disconnection request should be accepted is decided as disconnection request confirmation OK in step S26. The CPU 20 of the information terminal apparatus 2A, based on the decision of disconnection request confirmation OK, generates a disconnection response signal, and hands it over to the wireless connection module 44 via the I/F 28. The wireless connection module 44 transmits the above-mentioned disconnection response signal to the wireless connection module 40 of the projector 60 in step S27.

Then, the information terminal apparatus 2A and the projector 60 are disconnected once the CPU 20 of the information terminal apparatus 2A performs a disconnection process in step S28, the transfer of image information to the projector 60 from the information terminal apparatus 2A is terminated, and the projector 60 of the image display apparatus 1 finishes projecting and displaying on the screen 5 the image from the information terminal apparatus 2A. In step S29, the side of the projector becomes disconnected. As a result, in step S30, a disconnection process completion notice is transmitted from the projector 60 to the information terminal apparatus 2A. In step S31, the information terminal apparatus 2A becomes disconnected.

Next, the CPU 61 of the projector 60 generates a connection request signal with respect to the information terminal apparatus 2B that has been selected for switching connection to by the remote controller 69, hands it over to the wireless connection module 40 via the I/F 66, and transmits it from the wireless connection module 40 to the wireless connection module 44 of the appropriate information terminal apparatus 2B in step S32.

Thus, when a selection is made through the remote controller 69 to switch connection from the currently connected information terminal apparatus 2A to the other information terminal apparatus 2B, the CPU 61 of the projector 60 transmits the disconnection request signal to the currently connected information terminal apparatus 2A via the wireless connection module 40, receives the acceptance response signal (disconnection response signal) from the above-mentioned connected information terminal apparatus 2A, and transmits the connection request signal to the other information terminal apparatus 2B after connection is cut.

The information terminal apparatus 2B to which the connection request signal is sent in the above-mentioned step S32 receives the connection request signal through the wireless connection module 44 in step S33. The CPU 20 of the information terminal apparatus 2B receives via the I/F 28 the connection request signal received by the wireless connection module 44. Then, the CPU 20 generates a connection standby signal, and hands it over to the wireless connection module 44 via the I/F 28. The wireless connection module 44 transmits the connection standby signal to the wireless connection module 40 of the projector 60 in step S34.

Once the CPU 61 of the projector 60 interprets the above-mentioned connection standby signal received by the wireless connection module 40, a connection request result waiting state is entered in step S35.

After transmitting the above-mentioned connection standby signal, the information terminal apparatus 2B performs a connection request confirmation process at the CPU 20 in step S36, and determines whether or not it is currently possible to connect with the projector 60.

If, from this determination in step S36, the CPU 20 determines that connection is possible, the fact that the above-mentioned connection request should be accepted is decided as connection request confirmation OK in step S37. The CPU 20, based on the decision of connection request confirmation OK, generates a connection response signal, and hands it over to the wireless connection module 44 via the I/F 28. The wireless connection module 44 transmits the above-mentioned connection response signal to the wireless connection module 40 of the projector 60 in step S38.

Then, the information terminal apparatus 2B and the projector 60 are connected once the CPU 20 of the information terminal apparatus 2B performs a connection process in step S39, the transfer of image information from the information terminal apparatus 2B to the projector 60 is begun, and the projector 60 of the image display apparatus 1 projects and displays on the screen 5 the image from the information terminal apparatus 2B. In step S40, the side of the projector 60 becomes connected.

Naturally, in the example shown in FIG. 13, too, the wireless connection module 40 of the projector 60 receives image information from the information terminal apparatus 2B after receiving the acceptance response signal from the information terminal apparatus 2B in response to the connection request signal generated by the CPU 61.

Figure 14:
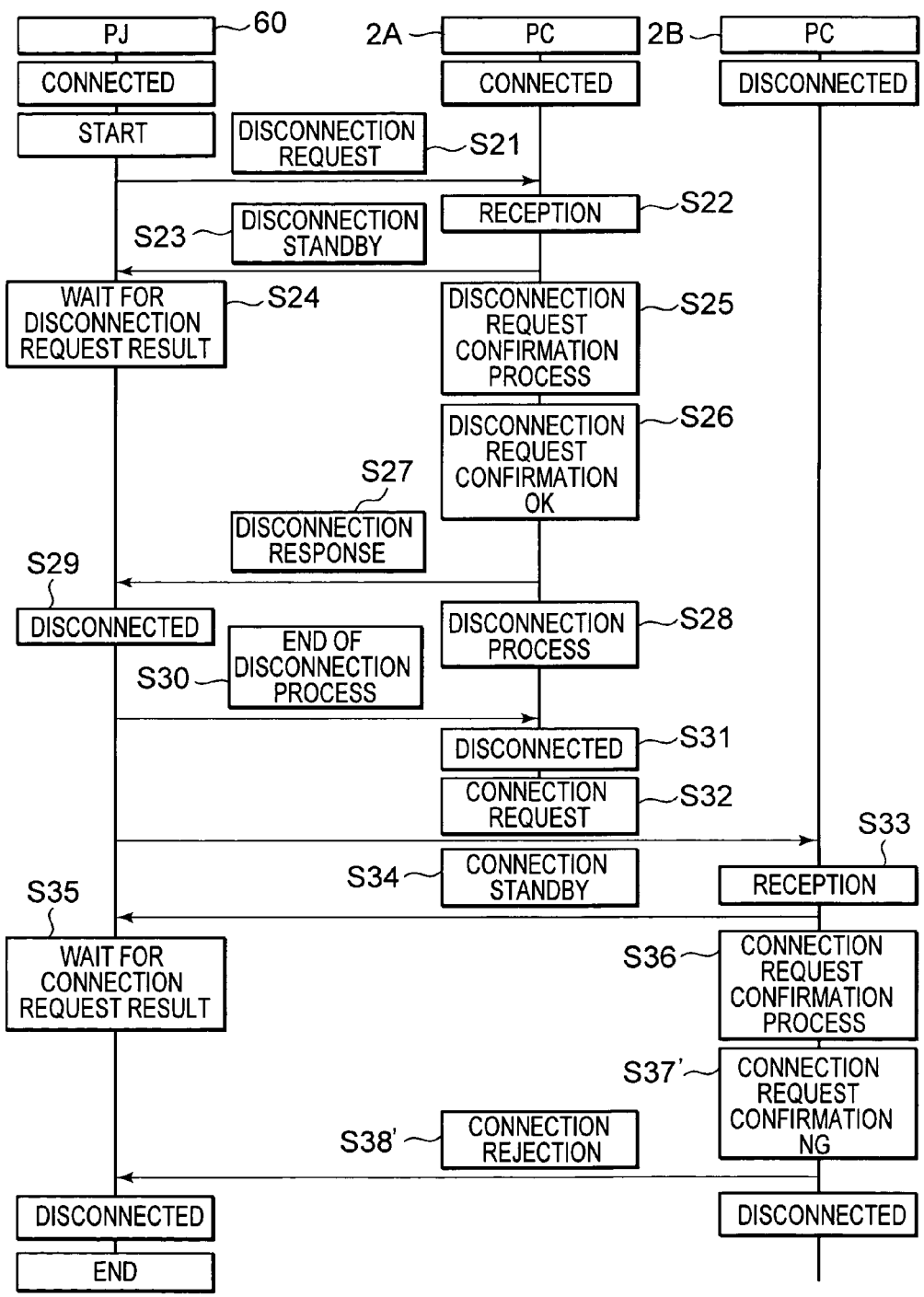
FIG. 14 is a sequence diagram of a case where a connected information terminal apparatus accepts a disconnection request from an image display apparatus but another information terminal apparatus rejects a connection request from the image display apparatus.

FIG. 14 is a sequence diagram of a case where the information terminal apparatus 2A accepts a disconnection request from the image display apparatus 1, but the information terminal apparatus 2B rejects a connection request from the image display apparatus 1.

In FIG. 14, the procedure from step S21 to step S31 performed between the projector 60 of the image display apparatus 1 and the information terminal apparatus 2A are similar to the above-mentioned case in FIG. 13, and therefore, a description thereof will be omitted.

Next, in the sequence diagram of FIG. 14, the connection request signal generated by the CPU 61 of the projector 60 with respect to the information terminal apparatus 2B that is selected for switching connection to by the remote controller 69 is handed over to the wireless connection module 40 via the I/F 66, and is transmitted from the wireless connection module 40 to the wireless connection module 44 of the appropriate information terminal apparatus 2B in step S32.

In this case, too, when a selection is made through the remote controller 69 to switch connection from the currently connected information terminal apparatus 2A to the other information terminal apparatus 2B, the CPU 61 of the projector 60 transmits the disconnection request signal to the currently connected information terminal apparatus 2A via the wireless connection module 40, receives the acceptance response signal (disconnection response signal) from the above-mentioned connected information terminal apparatus 2A, and transmits the connection request signal to the other information terminal apparatus 2B after connection is cut.

The information terminal apparatus 2B to which the connection request signal is sent in the above-mentioned step S32 receives the connection request signal through the wireless connection module 44 in step S33. The CPU 20 of the information terminal apparatus 2B receives via the I/F 28 the connection request signal received by the wireless connection module 44. Then, the CPU 20 generates a connection standby signal, and hands it over to the wireless connection module 44 via the I/F 28. The wireless connection module 44 transmits the connection standby signal to the wireless connection module 40 of the projector 60 in step S34.

Once the CPU 61 of the projector 60 interprets the above-mentioned connection standby signal received by the wireless connection module 40, a connection request result waiting state is entered in step S35.

After transmitting the above-mentioned connection standby signal, the information terminal apparatus 2B performs a connection request confirmation process at the CPU 20 in step S36, and determines whether or not it is currently possible to connect with the projector 60.

If, from this determination in step S36, the CPU 20 determines that connection is not possible, the fact that the above-mentioned connection request should be rejected is decided as connection request confirmation NG in step S37'. The CPU 20, based on the decision of connection request confirmation NG, generates a connection rejection signal, and hands it over to the wireless connection module 44 via the I/F 28. The wireless connection module 44 transmits the above-mentioned connection rejection signal to the wireless connection module 40 of the projector 60 in step S38'.

As a result, the projector 60 of the image display apparatus 1 goes on to maintain disconnection from waiting for the connection request result. In addition, the information terminal apparatus 2B also maintains disconnection. In this case, the transfer of image information is not performed. In other words, the image display apparatus 1, the information terminal apparatus 2A and the information terminal apparatus 2B all become disconnected. When the projector 60 of the image display apparatus 1 thus receives via the wireless connection module 40 the connection rejection signal from the information terminal apparatus 2B selected for switching connection to by the remote controller 69, the CPU 61 does not perform the process of connecting with the selected information terminal apparatus 2B. In addition, at this point, the CPU 61 may control the image signal output section 65 so as to display, on the PC connection guidance display section 73 within the PC selection screen 70 shown in FIG. 8, the fact that the selected information terminal apparatus 2B cannot be connected as in "the information terminal apparatus 2B cannot be connected." In addition, the PC selection screen 70 may be closed automatically.

In addition, at the image display apparatus 1, when connection is to be switched from the currently connected information terminal apparatus 2A to the other information terminal apparatus 2B through a selection made by the remote controller 69, the CPU 61 is to put the connection request signal to the above-mentioned other information terminal apparatus 2B on hold until the acceptance response signal from the above-mentioned connected information terminal apparatus 2A is received after transmitting via the wireless connection module 40 the disconnection request signal to the already connected information terminal apparatus 2A.

Figure 15:
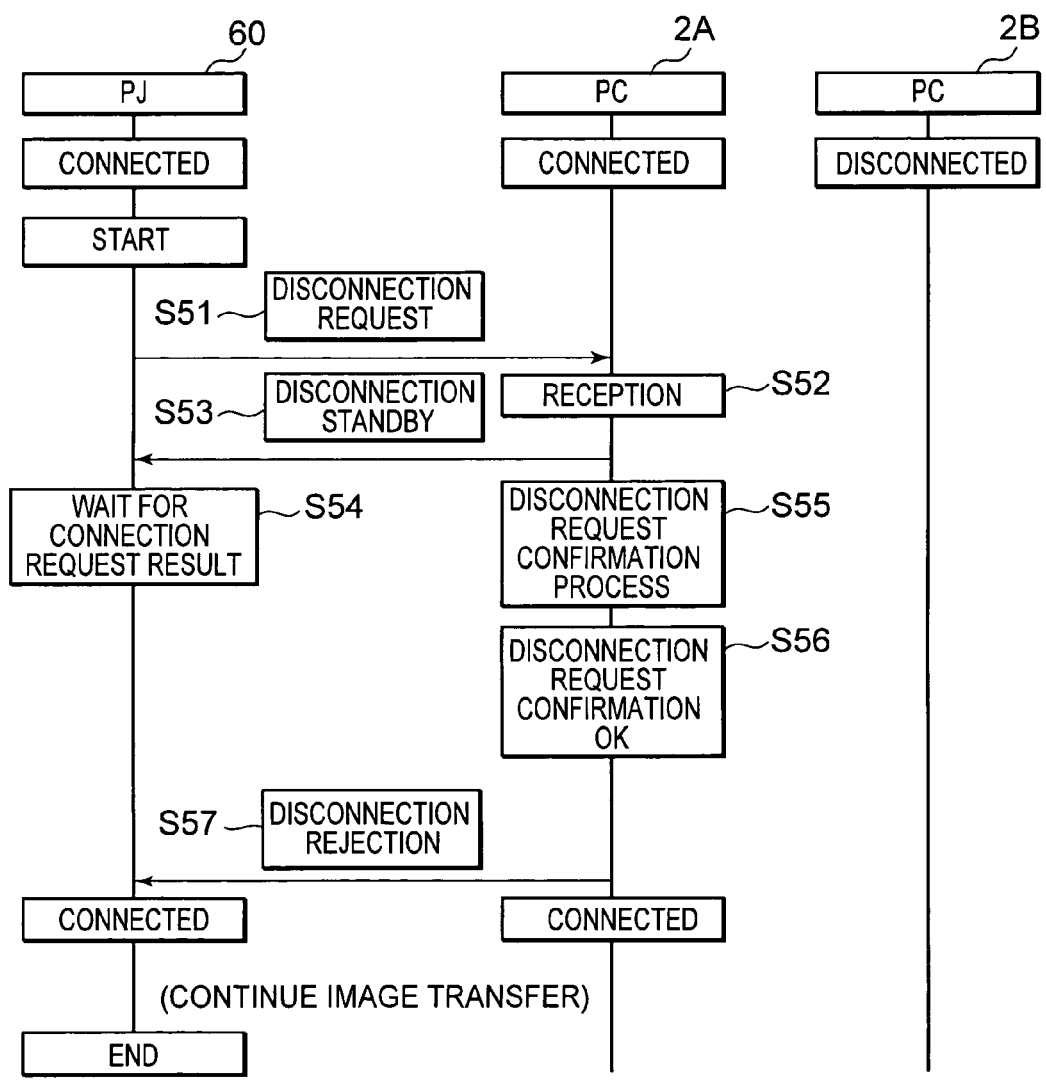
FIG. 15 is a sequence diagram of a case where a connected information terminal apparatus rejects a disconnection request from an image display apparatus, as a result of which another information terminal apparatus remains disconnected.

FIG. 15 is a sequence diagram of a case where the information terminal apparatus 2A rejects a disconnection request from the image display apparatus 1. In the sequence diagram of FIG. 15, a disconnection request signal generated by the CPU 61 of the projector 60 with respect to the information terminal apparatus 2A to which a disconnection request has been issued by the remote controller 69 is handed over to the wireless connection module 40 via the I/F 66, and is transmitted from the wireless connection module 40 to the wireless connection module 44 of the appropriate information terminal apparatus 2A in step S51.

The information terminal apparatus 2A to which the disconnection request signal is sent in the above-mentioned step S51 receives the disconnection request signal through the wireless connection module 44 in step S52. The CPU 20 of the information terminal apparatus 2A receives via the I/F 28 the disconnection request signal received by the wireless connection module 44. The CPU 20 generates a disconnection standby signal, and hands it over to the wireless connection module 44 via the I/F 28. The wireless connection module 44 transmits the disconnection standby signal to the wireless connection module 40 of the projector 60 in step S53.

Once the CPU 61 of the projector 60 interprets the above-mentioned disconnection standby signal received by the wireless connection module 40, a disconnection request result waiting state is entered in step S54.

After transmitting the above-mentioned disconnection standby signal, the information terminal apparatus 2A performs a disconnection request confirmation process at the CPU 20 in step S55, and determines whether or not it is currently possible to disconnect from the projector 60.

If, from this determination in step S55, the CPU 20 determines that disconnection is not possible, the fact that the above-mentioned disconnection request should be rejected is decided as disconnection request confirmation NG in step S56. The CPU 20, based on the decision of disconnection request confirmation NG, generates a disconnection rejection signal, and hands it over to the wireless connection module 44 via the I/F 28. The wireless connection module 44 transmits the above-mentioned disconnection rejection signal to the wireless connection module 40 of the projector 60 in step S57.

As a result, the projector 60 of the image display apparatus 1 goes on to maintain connection from waiting for the disconnection request result. The information terminal apparatus 2A also remains connected, continues the transfer of image information to the projector 60, and the projector 60 of the image display apparatus 1 continues to project and display on the screen 5 the image from the information terminal apparatus 2A. In addition, the information terminal apparatus 2B to which the image display apparatus 1 is to request connection ends up maintaining disconnection.

At this point, the CPU 61 may control the image signal output section 65 so as to display, on the PC connection guidance display section 73 within the PC selection screen 70 shown in FIG. 8, the fact that the information terminal apparatus 2A from which disconnection was attempted cannot be disconnected as in "the information terminal apparatus 2A cannot be disconnected." In addition, the PC selection screen 70 may be closed automatically.

As described above, through operations using the remote controller 69 and with respect to the projector 60 of the image display apparatus 1, the image display system 10 is capable of switching among a plurality of information terminal apparatuses connected to a network and selecting the desired information terminal apparatus therefrom, and of displaying on a display section image information from the desired information terminal apparatus. In other words, so long as the information terminal apparatuses are connected to the wireless network, images can be switched and displayed on the screen 5 with ease. In addition, the information terminal apparatuses connected to the network can be confirmed from the screen 5 of the image display apparatus 1. Further, since, just through operations from the remote controller 69 of the image display apparatus 1, it is possible to switch the information terminal apparatus whose image is to be projected onto the screen 5, even in cases where, for example, there are a plurality of presenters to present in a given order, it becomes unnecessary for each presenter, in accordance with the order, to perform an output on/off operation at each information terminal apparatus, and therefore, the gap in time until the next presentation is eliminated, and presentations can be conducted speedily.

Figure 16:
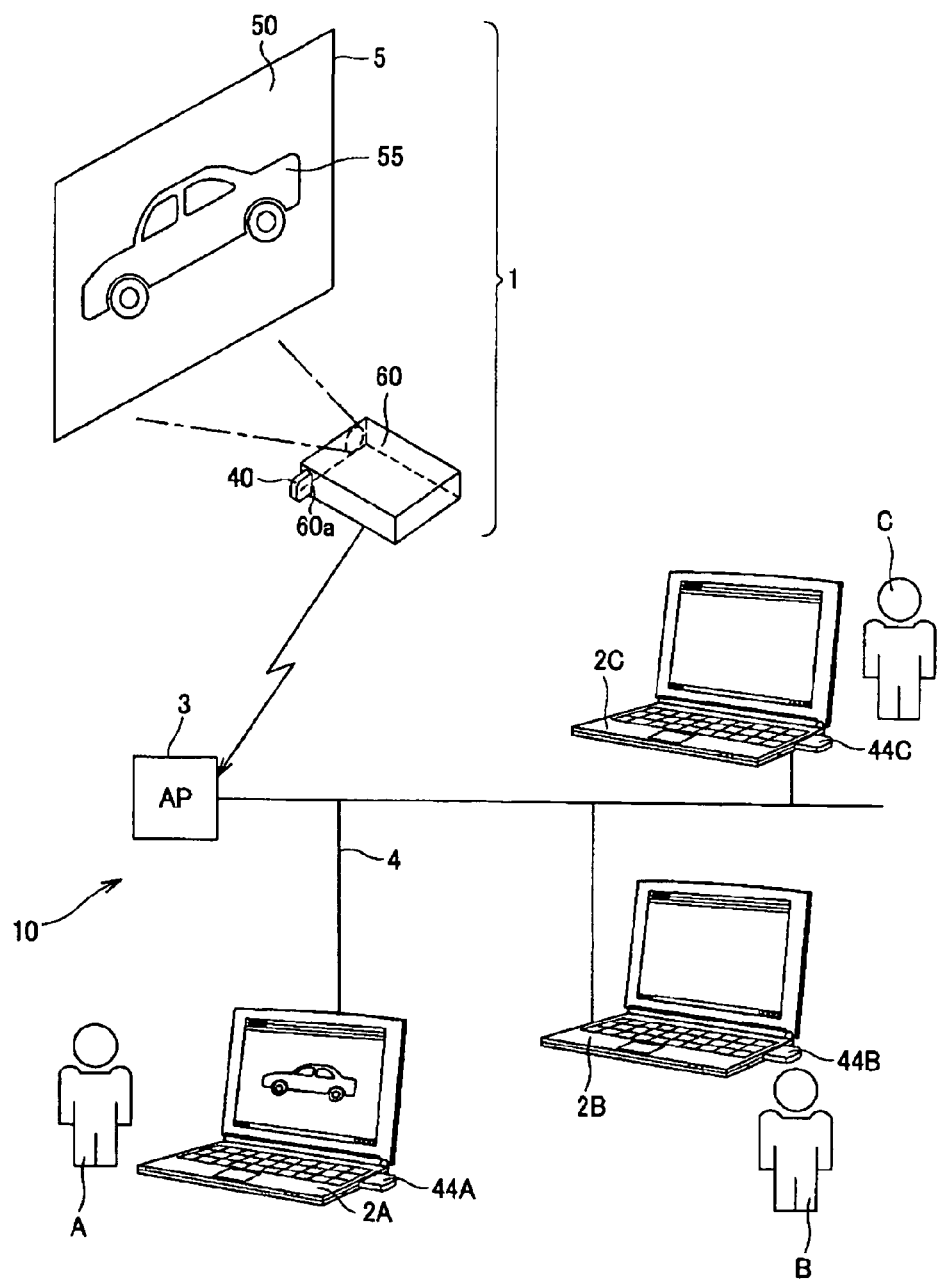
FIG. 16 is a diagram showing another example of an image display system 10 to which the present invention is applied.

The present invention is not to have its application limited to the above-mentioned image display system 10 whose configuration is shown in FIG. 1. FIG. 16 is a diagram showing another example of the image display system 10 to which the present invention is applied.

This other image display system 10 is a system in which the image display apparatus 1 and the information terminal apparatuses 2A, 2B and 2C are connected to a wireless network via an access point 3 compliant with IEEE 802.11b. Each of the information terminal apparatuses 2A, 2B and 2C has a configuration similar to the information terminal apparatus 2 described with reference to FIG. 7, and is connected through a LAN 4.

Figure 17:
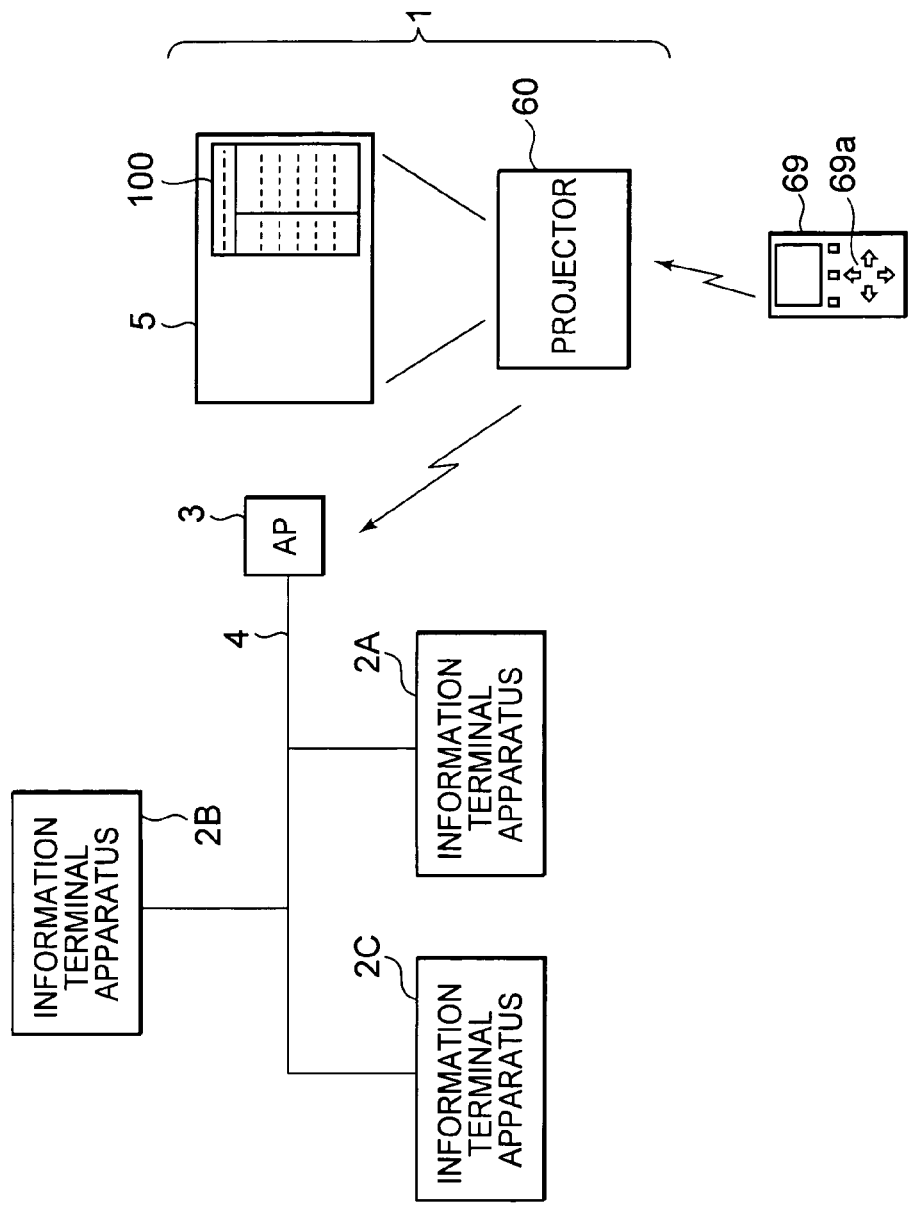
FIG. 17 is a configuration diagram used to described input operations of configuration items for an image display apparatus in the other image display system.

FIG. 17 is a configuration diagram for describing an input operation for configuration items for the image display apparatus 1 in the other image display system 10. First, the user loads the wireless connection module 40 shown in FIG. 4 into a predetermined slot on the projector 60. Under this condition, the power of the image display apparatus 1 is turned on. Next, the user presses a predetermined key (a wireless connection function key) provided within an operation section 69a on the remote controller 69. As a result, a configuration menu screen 100 is displayed on the screen 5. The configuration menu screen 100 has on/off selection section, such as the one shown in FIG. 18, for simple mode.

Figure 18:
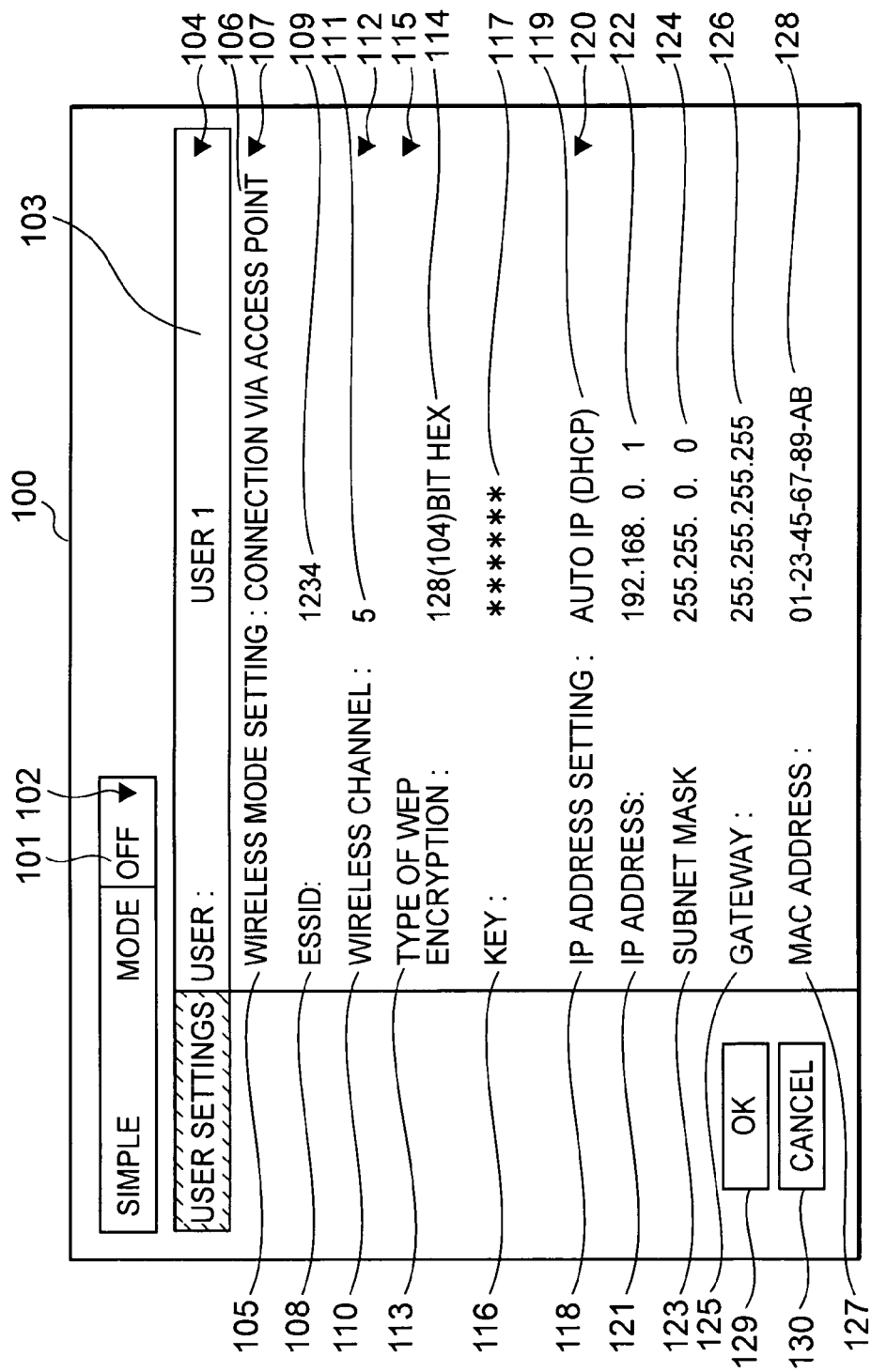
FIG. 18 is a diagram showing one example of a configuration menu screen.

FIG. 18 is a diagram showing an example of the configuration menu screen 100. As shown in FIG. 18, configuration items (contents) for the wireless connection of the image display apparatus 1 are complex. First, a user name input section 103 is provided on the configuration menu screen 100. Five user names, from user 1 to user 5, corresponding to five memories can be set. Various configuration contents can be stored for each user. In other words, a plurality of configurations can be stored. By manipulating the selection icon 104 using, for example, the left, right, up and down cursor keys and the enter key of the operation section 69a on the remote controller 69, a selection can be made from the five user names. Conventionally, since only one configuration could be held within the image display apparatus 1 even in cases where wireless network configuration and the like were available, in order to alter the configuration, input was necessary on each occasion. In the present invention, as described above, since it is possible to store a plurality of configurations, if configurations are prepared in advance for each venue at which the image display apparatus 1 is to be used, wireless connection becomes available by simply switching the memory (RAM 64). In other words, since the user stores a plurality of mutually differing text strings in storage means (RAM 64) using the above-mentioned input operation based on the environments in which the image display apparatus 1 is used, by simply preparing, in advance, configurations for each venue at which the image display apparatus 1 is to be used and switching the memory (RAM 64), the appropriate configuration item input for wireless network connection becomes usable.

A wireless mode setting item 105 refers to the network mode, and is a mode that can be selected, by maneuvering a selection icon 107, from a mode for connecting to an access point (access point connection mode) or a mode for connecting one-on-one with a given device (ad hoc mode). Here, access point connection 106 is selected.

An ESSID configuration item 108 is an item for identifying the network name (SSID), refers to the name of the network, and is a name that is unique to the image display apparatus 1. Here, it is taken to be a serial number "1234" 109. The same characters as those of a computer or an access point to be connected are input. Up to a maximum of thirty-two letters may be inputted.

Wireless channel configuration item 110 is an item for inputting a network channel, that is, the frequency band to be used. If the network mode is set to "ad hoc (peer to peer)," channels "1" to "11" may be selected, for example, through a selection icon 112. If it is set to "connection via access point (wireless access point)," the network channel is set to "auto" 111.

A WEP encryption type configuration item 113 is an item for selecting the method of data encryption communications. The encryption of data (WEP) is necessary in order to protect data from the risk of data interception since the present system constitutes a wireless network, and is selected from "off," "64(40)-bit ASCII," "128(104)-bit ASCII," "64(40)-bit HEX," and "128(104)-bit HEX." When, for this WEP encryption type configuration item 113, the user selects, using a selection icon 115, one of the above-mentioned encryption methods, the number and type of characters that can be inputted in an input area 117 of a key configuration item 116 are determined. If the user has selected with the selection icon 115 "128(104)-bit HEX" 114, it becomes possible to input the corresponding number and type of characters for 128(104)-bit HEX in the input area 117 of the key configuration item 116.

The key configuration item 116 is used for entering a key when the function of encrypting data is used for the WEP encryption type configuration item 113. The inputted key becomes an asterisk display 117. The same key as the computer or access point to be connected is inputted. There are restrictions as to the type and number of characters that can be used. The number of characters that can be input differs depending on the settings for data encryption. If "64(40)-bit ASCII" is selected for the WEP encryption type configuration item 113, the allowable number of characters would be five one-byte characters and symbols ("0 to 9," "A to Z," "a to z"). If "128(104)-bit ASCII" is selected, the allowable number of characters would be thirteen one-byte characters and symbols ("0 to 9," "A to Z," "a to z"). If "64(40)-bit HEX" is selected, the allowable number of characters would be ten characters in a combination of "0 to 9" and "a to f." If "128(104)-bit HEX" is selected, the allowable number of characters would be twenty-six characters in a combination of "0 to 9" and "a to f." Thus, for the key configuration item 116, since limitations are imposed on the type and number of characters that can be used, it is possible to make unnecessary characters not be displayed. Conventionally, even if there were input limitations, the act of inputting itself was possible. In the present invention, only the type of characters that can be inputted are displayed as candidates, and therefore, cases where characters not available for input are inputted and one has to input again are avoided.

In inputting the WEP key for this key configuration item 116, character selection is done by pressing the up/down key of the operation section 69a on the remote controller 69, position changes and character confirmation are done by pressing the left/right key of the operation section 69a, and overall confirmation is done by pressing the enter key of the operation section 69a.

The wireless setting mode, network name, wireless channel and data encryption method mentioned above are information relating to the configuration of the wireless connection module 40.

The IP address setting item 118 is an item for the user to select between "auto (DHCP)" and "manual" as the Internet protocol (IP) address configuration of the projector 60 of the image display apparatus 1. Here, auto IP (DHCP) 119 is selected with the selection icon 120. The projector 60 of the image display apparatus 1 is not a DHCP server of the wireless network, but since there is no configuration item corresponding to auto IP to begin with, by configuring it as DHCP, a flow is established where a DHCP server is searched for, and once it is identified that there is none, auto IP operates. If "manual" is selected, it is necessary to set an IP address configuration section 121, a subnet mask configuration section 123 and a default gateway configuration section 125 of this screen.

For the IP address configuration section 121, the IP address setting of the projector 60 of the image display apparatus 1 is entered in an input area 122 by selecting from numbers between 0 and 255. For the subnet mask configuration section 123, the subnet mask configuration of the image display apparatus 1 is entered in an input area 124 by selecting from numbers between 0 and 255. For the default gateway configuration section 125, the default gateway configuration of the image display apparatus 1 is entered in an input area 126 by selecting from numbers between 0 and 255.

MAC (Media Access Control) address configuration section 127 displays the MAC address of a configured wireless module on a display section 128.

In order to save the configuration for each item described above, the user may select an "OK" button 129 and press the enter key. As a result, the configuration is saved. In addition, in order to close the configuration menu without saving the configuration, the user may select a "cancel" button 130 and press the enter key.

In the other image display system 10, too, whose configuration is shown using FIG. 16 and FIG. 17 and whose method of inputting configuration items is shown using FIG. 18, the projector of the image display apparatus 1 performs the operations shown in FIG. 9 through FIG. 15 above in accordance with user operations using the above-mentioned PC selection screen 70.

As described above, the other image display system 10 of FIG. 16 is also capable of displaying on the display section the image information from the desired information terminal apparatus by switching among the plurality of information terminal apparatuses connected to the network via the access point AP 3 and selecting the desired information terminal apparatus therefrom through operations from the image display apparatus 1. In other words, as long as the information terminal apparatuses are connected to the wireless network, image information can easily be switched and displayed on the screen 5. In addition, information terminal apparatuses connected to the network can be identified from the screen 5 of the image display apparatus 1. Further, since the information terminal apparatus whose image is to be shown on the screen 5 can be switched merely by operations from the remote controller 69 of the image display apparatus 1, even in cases, for example, where there are a plurality of presenters who are to present in a given order, it is unnecessary for each presenter to carry out output on/off operations at each information terminal apparatus in accordance with the order, and therefore, the gap in time until the next presentation is eliminated, and presentations can be conducted speedily.

In the embodiment above, as the image display apparatus, an apparatus of a configuration comprised of a projector and a screen is given, however, the present invention is not to have its application limited to the above-mentioned apparatus. For example, it may also be applied to cathode ray tube display apparatuses that display images using cathode rays, or to image display apparatuses that display images on a liquid crystal display section (LCD).

What is claimed is:

1. An image display apparatus comprising:
   a plurality of network connection means for connecting two or more information terminal apparatuses to the apparatus, each network connection means including memory means for storing configuration information unique to the apparatus, each network connection means detachably connected to a corresponding information terminal apparatus;
   communication means for receiving image information received from the two or more information terminal apparatuses via a network;
   display means for displaying an enlarged image on a remote screen based on the image information;
   the screen located remote from the display means;
   holding means for holding in advance, of the two or more information terminal apparatuses, information of information terminal apparatuses whose connection to the network is desired;
   control means for reading out the information of the information terminal apparatuses held by the holding means;
   image signal output means for generating an image signal for displaying, on the display means, a list of the information of the two or more information terminal apparatuses read by the control means; and
   selecting means for selecting one information terminal apparatus from the list displayed on the display means, wherein the control means generates a connection request signal with respect to the information terminal apparatus selected by the selecting means, and the communications means transmits the connection request signal from the control means.

2. The image display apparatus as cited in claim 1, wherein the communications means receives the image signal after receiving an acceptance response signal from the information terminal apparatus corresponding to the connection request signal.

3. The image display apparatus as cited in claim 2, wherein when the information terminal apparatus performing the reception is changed to another information terminal apparatus by the selecting means, the control means controls the communications means to transmits a disconnection request signal to the connected information terminal apparatus, to receive an acceptance response signal from the connected information terminal apparatus, and after the connection is disconnected, to transmit a connection request signal to another information terminal apparatus.

4. The image display apparatus as cited in claim 3, wherein when the communications means receives a rejection signal from the information terminal apparatus selected by the selecting means, the control means controls to display that it is not able to connect to the selected information terminal apparatus.

5. The image display apparatus as cited in claim 3, wherein when changed to another information terminal apparatus, the control means controls the communications means to transmit a disconnection request signal to the connected information terminal apparatus, and to suspend to transmit a connection request signal until an acceptance response signal from the connected information terminal apparatus is received.

6. An image display system comprising:
   two or more information terminal apparatuses connectable to a network; and
   an image display apparatus including, a plurality of network connection means for connecting two or more information terminal apparatuses to the apparatus, each network connection means including memory means for storing configuration information unique to the apparatus, each network connection means detachably connected to a corresponding information terminal apparatus;

communication means for receiving image information received from the two or more information terminal apparatuses via a network;

display means for projecting an enlarged image on a remote screen based on the image information;

the screen located remote from the display means;

holding means for storing and holding in advance, of the two or more information terminal apparatuses, information of information terminal apparatuses whose connection to the network is desired;

control means for reading the information of the information terminal apparatuses held by the holding means;

image signal output means for generating an image signal for displaying, on the display means and, as a list, the information of the two or more information terminal apparatuses read by the control means; and selecting means for selecting one information terminal apparatus from the list displayed on the display means, wherein the control means generates a connection request signal with respect to the information terminal apparatus selected by the selecting means, the communications means transmits the connection request signal generated by the control means, the selected information terminal apparatus includes a second communications means and a second control means, when the second control means controls the second communications means to receive the connection request signal, the second control means determines whether the selected information terminal apparatus is connected to the image display apparatus or not, and when the second control means determines that the connection is possible, then the second control means controls the second communications means to transmit an acceptance response signal, and to transmit the image information to the image display apparatus.

7. An image display apparatus including:

a display section configured to project an enlarged image on a screen based on image information;

the screen located remote from the display section;

a plurality of network connection units configured to connect two or more information terminal apparatuses to the apparatus, each network connection unit including a memory storing configuration information unique to the apparatus, each network connection unit configured to be detachably connected to a corresponding information terminal apparatus; and a communication unit configured to receive the image information sent from two or more information terminal apparatuses via a network, the communication unit including, a holding unit configured to hold in advance, of the two or more information terminal apparatuses, information of information terminal apparatuses whose connection to the network is desired;

a controller configured to read out the information of the information terminal apparatuses held by the holding unit;

an image signal output unit configured to generate an image signal for displaying, on the display section, a list of the two or more information of the information terminal apparatuses read by the control unit; and a selection unit configured to select one information terminal apparatus from the list displayed on the display section, wherein the control unit is configured to generate a connection request signal with respect to the information terminal apparatus selected by the selection unit, and the communication unit is configured to transmit the connection request signal from the control unit.

8. The image display apparatus as cited in claim 7, wherein the communication unit is configured to receive the image signal after receiving an acceptance response signal from the information terminal apparatus corresponding to the connection request signal.

9. The image display apparatus as cited in claim 8, wherein when the information terminal apparatus performing the reception is changed to another information terminal apparatus by the selection unit, the control unit is configured to control the communication unit to transmit a disconnection request signal to the connected information terminal apparatus, to receive an acceptance response signal from the connected information terminal apparatus, and after the connection is disconnected, to transmit a connection request signal to another information terminal apparatus.

10. The image display apparatus as cited in claim 9, wherein when the communication unit is configured to receive a rejection signal from the information terminal apparatus selected by the selection unit, the control unit is configured to control to display that the image display apparatus is not able to connect to the selected information terminal apparatus.

11. The image display apparatus as cited in claim 9, wherein when changed to another information terminal apparatus, the control unit is configured to control the communication unit to transmit a disconnection request signal to the connected information terminal apparatus, and to suspend the transmission of a connection request signal until an acceptance response signal from the connected information terminal apparatus is received.

12. The image display apparatus as cited in claim 7, further comprising:

an image control unit configured to send a command to the two or more information terminal apparatuses to send the image signal to the communication unit at in a fast forwarding or rewinding mode.

13. The image display apparatus as cited in claim 7, wherein the memory of each network connection unit stores a network name and a data encryption key unique to the apparatus.

14. The image display apparatus as cited in claim 13, wherein the memory of each network connection unit stores a Wired Equivalent Privacy (WEP) data encryption key unique to the apparatus.

15. The image display apparatus as cited in claim 1, further comprising:

image control means for sending a command to the two or more information terminal apparatuses to send the image signal to the communication means at in a fast forwarding or rewinding mode.

16. The image display apparatus as cited in claim 1, wherein the memory means of each network connection means stores a network name and a data encryption key unique to the apparatus.

17. The image display apparatus as cited in claim 16, wherein the memory means of each network connection unit stores a Wired Equivalent Privacy (WEP) data encryption key unique to the apparatus.

* * * * *